US011897790B2

(12) United States Patent
Tsutano et al.

(10) Patent No.: US 11,897,790 B2
(45) Date of Patent: Feb. 13, 2024

(54) METHOD FOR PRODUCING ULTRAPURE WATER, ULTRAPURE WATER PRODUCTION SYSTEM, AND ION EXCHANGER-FILLED MODULE

(71) Applicant: ORGANO CORPORATION, Tokyo (JP)

(72) Inventors: Kyohei Tsutano, Tokyo (JP); Hitoshi Takada, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 230 days.

(21) Appl. No.: 17/053,259

(22) PCT Filed: May 15, 2019

(86) PCT No.: PCT/JP2019/019348
§ 371 (c)(1),
(2) Date: Nov. 5, 2020

(87) PCT Pub. No.: WO2019/221187
PCT Pub. Date: Nov. 21, 2019

(65) Prior Publication Data
US 2021/0246050 A1    Aug. 12, 2021

(30) Foreign Application Priority Data

May 17, 2018    (JP) .................. 2018-095623

(51) Int. Cl.
*C02F 1/42* (2023.01)
*B01J 41/04* (2017.01)
(Continued)

(52) U.S. Cl.
CPC .............. *C02F 1/42* (2013.01); *B01J 41/04* (2013.01); *B01J 41/14* (2013.01); *B01J 47/022* (2013.01);
(Continued)

(58) Field of Classification Search
CPC ........ B01D 19/00; B01D 61/08; B01D 61/58; B01D 61/025; B01D 61/44; B01D 15/362;
(Continued)

(56) References Cited

U.S. PATENT DOCUMENTS 9,607,864 B2 * 3/2017 Zhang ................. B01D 15/362
2011/0290714 A1   12/2011 Inoue et al.

FOREIGN PATENT DOCUMENTS

JP    57-15885      1/1982
JP    2000-140631   5/2000
(Continued)

OTHER PUBLICATIONS

English machine translation of JP 2010264344A to Hiroshi; Nov. 25, 2010; 54 pages. (Year: 2010).*
(Continued)

*Primary Examiner* — Magali P Slawski
*Assistant Examiner* — Robin S Gray
(74) *Attorney, Agent, or Firm* — Greenblum & Bernstein, P.L.C.

(57) ABSTRACT

Provided is a method for producing ultrapure water to supply, to a use point, ultrapure water obtained by treating raw material water for ultrapure water production in an ultrapure water production apparatus, wherein the raw material water for ultrapure water production contains at least one or more elements selected from B, As, Al, Ti, Cr, Fe, Cu, Zn, Sn, V, Ga, and Pb, and wherein an ion exchanger-filled module filled with at least a monolithic organic porous anion exchanger is installed in a treatment path of the ultrapure water production apparatus or in a transfer path from the ultrapure water production apparatus to the use point, and water to be treated is passed through the ion exchanger-filled module for treatment.

5 Claims, 11 Drawing Sheets

(51) Int. Cl.
    *B01J 47/028*     (2017.01)
    *B01J 41/14*     (2006.01)
    *B01J 47/022*     (2017.01)
    *C02F 101/10*     (2006.01)
    *C02F 101/20*     (2006.01)
    *C02F 101/22*     (2006.01)
    *C02F 103/04*     (2006.01)
    *C02F 103/34*     (2006.01)

(52) U.S. Cl.
    CPC ....... B01J 47/028 (2013.01); *C02F 2001/422* (2013.01); *C02F 2001/425* (2013.01); *C02F 2101/103* (2013.01); *C02F 2101/108* (2013.01); *C02F 2101/20* (2013.01); *C02F 2101/203* (2013.01); *C02F 2101/22* (2013.01); *C02F 2103/04* (2013.01); *C02F 2103/346* (2013.01); *C02F 2201/006* (2013.01)

(58) Field of Classification Search
    CPC .............. B01D 15/363; B01D 19/0031; B01D 2311/2619; B01D 2311/2623; B01D 2311/2653; C08J 5/20; C08J 9/36; C08F 2220/26; C08F 212/36; C08F 2/44; C08F 2/32; B01J 47/04; B01J 47/12; B01J 47/022; B01J 47/028; B01J 47/00; B01J 47/024; B01J 20/26; B01J 20/28; B01J 20/30; B01J 20/28042; B01J 20/28085; B01J 20/32; B01J 20/28054; B01J 20/28069; B01J 20/28078; B01J 20/28083; B01J 20/3212; B01J 20/3219; B01J 20/3248; B01J 20/3253; B01J 49/00; B01J 39/04; B01J 39/18; B01J 39/20; B01J 39/05; B01J 39/028; B01J 41/05; B01J 41/14; C02F 2101/30; C02F 2101/00; C02F 2101/103; C02F 2101/108; C02F 2101/20; C02F 2101/203; C02F 2101/22; C02F 2201/006; C02F 9/08; C02F 9/00; C02F 2103/04; C02F 2103/346; C02F 2001/422; C02F 2001/425; C02F 1/20; C02F 1/42; C02F 1/44; C02F 1/72; C02F 1/32; C02F 1/469; C02F 1/441; C02F 1/28; C02F 1/285; C02F 103/04; C07C 31/10; C07C 29/76
    See application file for complete search history.

(56) References Cited

FOREIGN PATENT DOCUMENTS

| | | | | |
|---|---|---|---|---|
| JP | 2006-346543 | | 12/2006 | |
| JP | 2007-313506 | | 12/2007 | |
| JP | 2010-234356 | | 10/2010 | |
| JP | 2010-264344 | | 11/2010 | |
| JP | 2010264344 | A * | 11/2010 | |
| JP | 2017-000970 | | 1/2017 | |
| JP | 2017-119233 | A | 7/2017 | |
| KR | 10-2005-0027981 | A | 3/2005 | |
| TW | 201024342 | A | 7/2010 | |
| TW | 201630653 | A | 9/2016 | |
| WO | 2010/070774 | | 6/2010 | |
| WO | WO-2017115550 | A1 * | 7/2017 | .............. B01J 39/04 |

OTHER PUBLICATIONS

English machine Translation of JP-2010264344-A; 54 pages (Year: 2009).*

English machine Translation of WO-2017115550-A1; 82 pages (Year: 2017).*

Office Action for the corresponding Taiwanese Patent Application No. 108117012 dated Jun. 24, 2022, along with English translation thereof, 16 pages.

Official Communication issued in International Patent Application No. PCT/JP2019/019348, dated Aug. 13, 2019, along with English translation, 4 pages.

Office Action issued in corresponding India Patent Application No. 202017048301 dated Feb. 23, 2021, along with English translation thereof, 6 pages.

Office Action issued in corresponding Korean Patent Application No. 10-2020-7026055 dated Dec. 8, 2021, along with English translation thereof, 47 pages.

Office Action in family member Taiwanese application No. 108117012 dated Feb. 1, 2023, and English language translation thereof, 7 pages.

* cited by examiner

METHOD FOR PRODUCING ULTRAPURE WATER, ULTRAPURE WATER PRODUCTION SYSTEM, AND ION EXCHANGER-FILLED MODULE

TECHNICAL FIELD

The present invention relates to: a method for producing ultrapure water to supply, to a use point, ultrapure water obtained by treating raw material water for ultrapure water production in an ultrapure water production apparatus; an ultrapure water production system for performing the method; and an ion exchanger-filled module for use therein. In particular, the present invention relates to: a method for producing ultrapure water to supply, to the use point, ultrapure water obtained by treating collected ultrapure water that has been used in a washing step of the semiconductor production process, which is used as the raw material water for ultrapure water production, in the ultrapure water production apparatus; an ultrapure water production system for performing the method; and an ion exchanger-filled module for use therein.

BACKGROUND ART

In the semiconductor production process, ultrapure water is used for washing semiconductors. This ultrapure water is usually produced in an ultrapure water production apparatus by refining and purifying raw material water for ultrapure water production, and is supplied to a use point.

As a conventional ultrapure water production apparatus, for example, Patent Literature 1 discloses an ultrapure water production apparatus in which ultrapure water is transferred via a pipe and supplied to a use point, wherein a module is installed in the middle of the pipe for transferring ultrapure water and ultrapure water is further treated with the module, the module being filled with an organic porous ion exchanger that is a continuous macropore structural material in which bubble-like macropores overlap each other and these overlapping areas become apertures with an average diameter of 30 to 300 μm in the water wet state; has a total pore volume of 0.5 to 5 ml/g and an ion exchange capacity per volume in a water wet state of 0.4 to 5 mg equivalent/ml; has ion exchange groups uniformly distributed in the porous ion exchanger; and, in a SEM image of the cut section of the continuous macropore structural material (dried material), has an area of the framework part appearing in the cross section of 25 to 50% in the image region, or the module being filled with an organic porous ion exchanger that is a co-continuous structural material formed of a three dimensionally continuous framework comprising an aromatic vinyl polymer containing 0.3 to 5.0 mol % of crosslinked structural units among all constituent units into which ion exchange groups have been introduced, with a thickness of 1 to 60 μm, and three dimensionally continuous pores in the framework with a diameter of 10 to 100 μm; has a total pore volume of 0.5 to 5 ml/g; has an ion exchange capacity per volume in a water wet state of 0.3 to 5 mg equivalent/ml; and has ion exchange groups uniformly distributed in the porous ion exchanger.

Here, compound semiconductors are currently used for light emitting elements such as light emitting diodes (LEDs) and laser diodes (LDs). For example, examples of the compound semiconductor currently in use include InP (indium phosphide) and GaN (gallium nitride).

Although it has not yet been industrialized so far, GaAs (gallium arsenide) is another compound semiconductor other than the above. And in the future, the production of GaAs as a compound semiconductor may be industrialized.

In the semiconductor production process, the ultrapure water that has been used for washing semiconductors is usually collected and used again as a part of raw material water for ultrapure water production. If so, assuming that ultrapure water is used in the GaAs production process, it is presumed that the GaAs production process will produce collected water with a high As content. Therefore, a method for producing ultrapure water that can remove As from the collected ultrapure water is required.

However, since As-based semiconductors have not been industrially produced up to now, the technology for removing As from ultrapure water has not been investigated to a great extent. In Patent Literature 1, there is no description that As is contained in ultrapure water.

As a technique for removing As in the water to be treated, for example, Patent Literature 2 discloses a water treatment apparatus comprising a desalination treatment means and an ion adsorption treatment means using a porous formed material as an adsorbing agent, wherein the porous formed material comprises an organic polymer resin and an inorganic ion adsorbent and has communication holes opening on its outer surface; has voids in the inside of the fibrils forming the communication holes; and has at least a part of the voids opening on the surface of the fibrils, wherein the inorganic ion adsorbent is supported on the outer surface of the fibrils and the surface of the internal voids.

CITATION LIST

Patent Literature

[Patent Literature 1] Japanese Patent Laid-Open No. 2010-234356
[Patent Literature 2] Japanese Patent Laid-Open No. 2006-346543

SUMMARY OF INVENTION

Technical Problem

However, since the semiconductor production process uses a large amount of ultrapure water, it is anticipated that the water treatment method as described in Patent Literature 2 will not be able to secure a sufficient amount of ultrapure water. Furthermore, if the throughput of the water to be treated is increased, there is also a concern for the risk that the removal of As may be insufficient.

Also, in addition to As, elements such as B, Al, Ti, Cr, Fe, Cu, Zn, Sn, V, Ga, and Pb may reduce the yield in the semiconductor production, it may be necessary to develop a method for producing ultrapure water, in which collected ultrapure water that contains these elements can be used as raw material water for ultrapure water production to ensure a sufficient supply of ultrapure water to be used in the semiconductor production process.

Accordingly, an object of the present invention is to provide a method for producing ultrapure water for the semiconductor production process by using raw material water for ultrapure water production that contains at least one or more elements selected from B, As, Al, Ti, Cr, Fe, Cu, Zn, Sn, V, Ga, and Pb as the raw material water for ultrapure water production.

Solution to Problem

The problem described above is solved by the present invention shown below.

That is, the present invention (1) provides a method for producing ultrapure water to supply, to a use point, ultrapure water obtained by treating raw material water for ultrapure water production in an ultrapure water production apparatus, wherein the raw material water for ultrapure water production contains metal impurities of any one or two or more elements selected from B, As, Al, Ti, Cr, Fe, Cu, Zn, Sn, V, Ga, and Pb, and wherein an ion exchanger-filled module filled with at least a monolithic organic porous anion exchanger is installed in a treatment path of the ultrapure water production apparatus or in a transfer path from the ultrapure water production apparatus to the use point, and water to be treated is passed through the ion exchanger-filled module for treatment.

In addition, the present invention (2) provides the method for producing ultrapure water according to (1), wherein all of the raw material water for ultrapure water production or a part of raw material water to be mixed with the raw material water for ultrapure water production is collected washing water that has been used for washing semiconductors in a washing step of a semiconductor production process.

In addition, the present invention (3) provides the method for producing ultrapure water according to (1) or (2), wherein the raw material water for ultrapure water production contains at least one element selected from B and As.

In addition, the present invention (4) provides the method for producing ultrapure water according to any of (1) to (3), wherein the monolithic organic porous anion exchanger is formed of a continuous framework phase and a continuous pore phase; has a thickness of a continuous framework of 1 to 100 µm, an average diameter of continuous pores of 1 to 1000 µm, and a total pore volume of 0.5 to 50 mL/g; has an anion exchange capacity of 0.1 to 1.0 mg equivalent/mL (wet state); and is a monolithic organic porous anion exchanger in which anion exchange groups are uniformly distributed in an organic porous cation exchanger.

In addition, the present invention (5) provides the method for producing ultrapure water according to (4), wherein the monolithic organic porous anion exchanger is a co-continuous structural material formed of a three dimensionally continuous framework comprising an aromatic vinyl polymer containing 0.1 to 5.0 mol % of crosslinked structural units among the entire constituent units, with an average thickness of 1 to 60 µm in a dry state, and three dimensionally continuous pores in the framework with an average diameter of 10 to 200 µm in a dry state; has a total pore volume of 0.5 to 10 mL/g in a dry state; has anion exchange groups; has an anion exchange capacity per volume in a water wet state of 0.2 to 1.0 mg equivalent/mL (water wet state); and is a monolithic organic porous anion exchanger in which the anion exchange groups are uniformly distributed in the organic porous anion exchanger.

In addition, the present invention (6) provides the method for producing ultrapure water according to any of (1) to (5), wherein the ion exchanger-filled module is filled with a cation exchanger in a stage preceding or subsequent to the monolithic organic porous anion exchanger.

In addition, the present invention (7) provides the method for producing ultrapure water according to any of (1) to (6), wherein the water to be treated is passed through the monolithic organic porous anion exchanger-filled module at a water passing speed SV of 20000 $h^{-1}$ or less.

In addition, the present invention (8) provides an ultrapure water production system for carrying out the method for producing ultrapure water according to any of (1) to (7), wherein the system has an organic porous ion exchanger-filled module filled with a monolithic organic porous anion exchanger in a treatment path of an ultrapure water production apparatus or in a transfer path from an ultrapure water production apparatus to a use point.

In addition, the present invention (9) provides an ion exchanger-filled module, wherein the module is filled with at least a monolithic organic porous anion exchanger, and wherein the module is installed in a treatment path of an ultrapure water production apparatus of an ultrapure water production system for supplying, to a use point, ultrapure water obtained by treating raw material water for ultrapure water production in the ultrapure water production apparatus, or in a transfer path from the ultrapure water production apparatus to the use point.

In addition, the present invention (10) provides the ion exchanger-filled module according to (9), wherein the monolithic organic porous anion exchanger is formed of a continuous framework phase and a continuous pore phase; has a thickness of a continuous framework of 1 to 100 µm, an average diameter of continuous pores of 1 to 1000 µm, and a total pore volume of 0.5 to 50 mL/g; has an anion exchange capacity of 0.1 to 1.0 mg equivalent/mL (wet state); and is a monolithic organic porous anion exchanger in which anion exchange groups are uniformly distributed in an organic porous anion exchanger.

In addition, the present invention (11) provides the ion exchanger-filled module according to (10), wherein the monolithic organic porous anion exchanger is a co-continuous structural material formed of a three dimensionally continuous framework comprising an aromatic vinyl polymer containing 0.1 to 5.0 mol % of crosslinked structural units among the entire constituent units, with an average thickness of 1 to 60 µm in a dry state, and three dimensionally continuous pores in the framework with an average diameter of 10 to 200 µm in a dry state; has a total pore volume of 0.5 to 10 mL/g in a dry state; has anion exchange groups; has an anion exchange capacity per volume in a water wet state of 0.2 to 1.0 mg equivalent/mL (water wet state); and is a monolithic organic porous anion exchanger in which the anion exchange groups are uniformly distributed in the organic porous anion exchanger.

In addition, the present invention (12) provides the ion exchanger-filled module according to any of (8) to (11), wherein the ion exchanger-filled module is filled with a cation exchanger in a stage preceding or subsequent to the monolithic organic porous anion exchanger.

Advantageous Effects of Invention

According to the present invention, a method for producing ultrapure water for the semiconductor production process by using raw material water for ultrapure water production that contains at least one or more elements selected from B, As, Al, Ti, Cr, Fe, Cu, Zn, Sn, V, Ga, and Pb as the raw material water for ultrapure water production can be provided.

DESCRIPTION OF EMBODIMENTS

The method for producing ultrapure water of the present invention is a method for producing ultrapure water to supply, to a use point, ultrapure water obtained by treating raw material water for ultrapure water production in an ultrapure water production apparatus, wherein the raw material water for ultrapure water production contains at least one or more elements selected from B, As, Al, Ti, Cr, Fe, Cu, Zn, Sn, V, Ga, and Pb, and wherein an organic porous ion exchanger-filled module filled with a monolithic organic porous anion exchanger is installed in a treatment path of the ultrapure water production apparatus or in a transfer path from the ultrapure water production apparatus to the use point, and water to be treated is passed through the organic porous ion exchanger-filled module for treatment.

The method for producing ultrapure water of the present invention is a method for producing ultrapure water to produce ultrapure water to be used in a washing step for semiconductors (use point) in the semiconductor production process.

Figure 13:
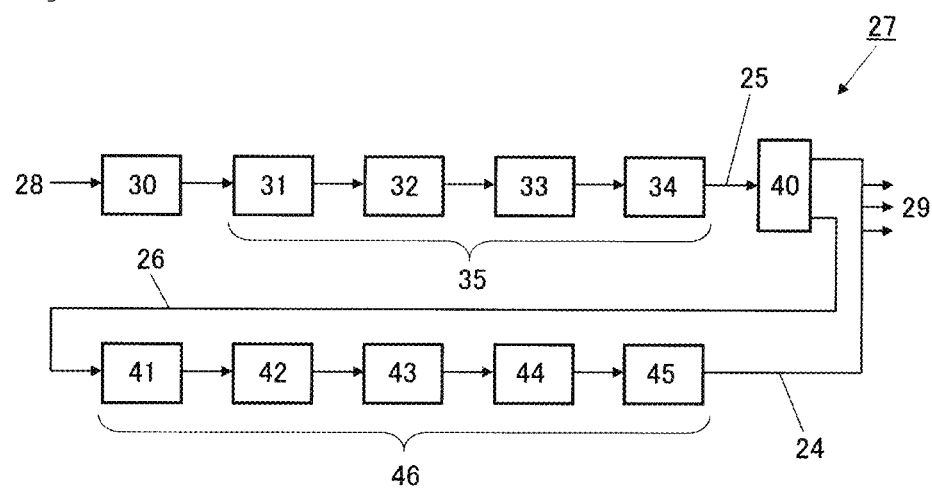
FIG. 13 is a schematic flow diagram showing an exemplary embodiment of an ultrapure water production system.

There is no particular limitation on the ultrapure water production apparatus according to the method for producing ultrapure water of the present invention as long as it is an apparatus for producing ultrapure water to be used in the semiconductor production process. An ultrapure water production system usually comprises a pretreatment system, a primary pure water production system, and a secondary pure water production system. The primary pure water production system usually has a flocculation filtration apparatus, an activated carbon column, a reverse osmosis membrane module, and an ion exchange resin apparatus. And, the secondary pure water production system usually has a heat exchanger, an ultraviolet oxidation system, a non-regenerative cartridge polisher filled with an ion exchange resin, a deaeration membrane apparatus, and an ultrafiltration membrane apparatus. In the ultrapure water production system, the primary ultrapure water obtained in the primary pure water production system is treated in the secondary pure water production system to obtain ultrapure water, and therefore, the apparatus constituting the secondary pure water production system in the ultrapure water production system is the ultrapure water production apparatus according to the method for producing ultrapure water of the present invention. Examples of the ultrapure water production system include, for example, an exemplary embodiment shown in FIG. 13. FIG. 13 is a schematic flow diagram showing an exemplary embodiment of the ultrapure water production system. In FIG. 13, an ultrapure water production system 27 comprises a pretreatment system 30, a primary pure water production system 35, and a secondary pure water production system 46. The primary pure water production system 35 has a flocculation filtration apparatus 31, an activated carbon column 32, a reverse osmosis membrane module 33, and an ion exchange resin apparatus 34. And, the secondary pure water production system 46 has a heat exchanger 41, an ultraviolet oxidation system 42, a non-regenerative cartridge polisher 43 filled with an ion exchange resin, a deaeration membrane apparatus 44, and an ultrafiltration membrane apparatus 45. Also, between the primary pure water production system 35 and the secondary pure water production system 46, a primary pure water storage tank 40 is provided, in which the primary pure water produced in the primary pure water production system 35 is stored and the remainder of the ultrapure water supplied to a use point 29 but left unconsumed is returned. In this ultrapure water production system 27, the secondary pure water production system 46, that is, the heat exchanger 41, the ultraviolet oxidation system 42, the non-regenerative cartridge polisher 43 filled with an ion exchange resin, the deaeration membrane apparatus 44, and the ultrafiltration membrane apparatus 45 fall under the ultrapure water production apparatus. And, in the ultrapure water production system 27, raw water 28 is firstly treated in the pretreatment system 30, and then treated in the primary pure water production system 35 to obtain primary pure water 25. The primary pure water 25 obtained in the primary pure water production system 35 is delivered to the primary pure water storage tank 40. Also, to the primary pure water storage tank 40, the returned ultrapure water that was supplied to the use point 29 but left unconsumed is returned. Then, in the primary pure water storage tank 40, the primary pure water 25 obtained in the primary pure water production system 35 and the returned ultrapure water are mixed, and raw material water for ultrapure water production 26 is obtained. Next, the raw material water for ultrapure water production 26 is treated in the secondary pure water production system 46 to obtain ultrapure water 24. Subsequently, the ultrapure water 24 obtained in the secondary pure water production system 46 is supplied to the use point 29, and while using it at the use point 29, the remainder of the ultrapure water not consumed is returned to the primary pure water storage tank 40.

There is no particular limitation on the raw material water for ultrapure water production according to the method for producing ultrapure water of the present invention as long as it is raw material water normally used for the production of ultrapure water for the semiconductor production, and examples thereof include, for example, primary pure water obtained by treating industrial water, city water, well water, river water, or the like in the primary pure water production system, collected ultrapure water that has been used for washing semiconductors in a washing step in the semiconductor production process, and mixed water between the primary pure water and the collected ultrapure water. The raw material water for ultrapure water production refers to, for example, water with an electrical conductivity of 20 µS/cm or less. In the semiconductor production process, the production of ultrapure water is usually carried out by mixing the ultrapure water that has been used for washing semiconductors, that is, the collected ultrapure water with the raw material water such as primary pure water obtained by treating industrial water, city water, well water, river water, or the like in the primary pure water production system, and using the resulting water as the raw material water for ultrapure water production.

The raw material water for ultrapure water production contains metal impurities of any one or two or more elements selected from B, As, Al, Ti, Cr, Fe, Cu, Zn, Sn, V, Ga, and Pb. The monolithic organic porous anion exchanger-filled module according to the method for producing ultrapure water of the present invention exerts excellent performance particularly in adsorbing and removing B and As. Therefore, the raw material water for ultrapure water production is raw material water for ultrapure water production that contains metal impurities of at least any one or two or more elements selected from B, As, Al, Ti, Cr, Fe, Cu, Zn, Sn, V, Ga, and Pb, preferably raw material water for ultrapure water production that contains metal impurities of at least any one or two element selected from B and As, and particularly preferably raw material water for ultrapure water production that contains As as an essential metal impurity. In addition, B, As, Al, Ti, Cr, Fe, Cu, Zn, Sn, V, Ga, and Pb are contained at a large amount in the washing water that has been used in a washing step of the process for producing semiconductors having these elements, that is, in the collected ultrapure water, and therefore, all of the raw material water for ultrapure water production or the raw material water to be mixed as a part of the raw material for ultrapure water production is preferably collected ultrapure water that contains metal impurities of at least any one or two or more elements selected from B, As, Al, Ti, Gr, Fe, Cu, Zn, Sn, and Sb, particularly preferably collected ultrapure water that contains metal impurities of at least any one or two of the following: B and As, and more preferably collected ultrapure water that contains As as an essential metal impurity. Note that, in the present invention, the collected ultrapure water refers to washing water that has been used in a washing step of the semiconductor production process.

In the raw material water for ultrapure water production, metal impurities are mainly present as ionic impurities of or as fine particles in an aggregated state or dispersed state of any one or two or more elements selected from B, As, Al, Ti, Gr, Fe, Cu, Zn, Sn, and Sb. The monolithic organic porous anion exchanger exerts excellent performance particularly in capturing B or As.

The raw material water for ultrapure water production contains, as metal impurities, ionic impurities or fine particles of any one or two or more elements selected from B, As, Al, Ti, Gr, Fe, Cu, Zn, Sn, and Sb.

Also, the ultrapure water to be used in the semiconductor production process may contain, for example, organic fine particles generated from polytetrafluoroethylene, which is used as a structural material for a variety of members in the equipment for the semiconductor production process, inorganic fine particles generated from piping materials or joints in the ultrapure water transfer line, and the like. As such, in the ultrapure water to be used in the semiconductor production process, it is necessary to remove such fine particles. And, in the present invention, among these fine particles, the inorganic fine particles and the aggregates of the inorganic fine particles and the organic fine particles can be removed.

Examples of the fine particles contained in the raw material water for ultrapure water production according to the method for producing ultrapure water of the present invention include organic fine particles such as polytetrafluoroethylene, polyvinylidene fluoride, and perfluoroalkoxyalkane, and inorganic fine particles such as iron oxide, aluminum oxide, and copper oxide. In addition, a state where the above particles are aggregated is included as well. Although the size of the fine particles is not particularly limited, it is, for example, 1 to 100 nm.

The raw material water for ultrapure water production may contain metal impurities of any one or two or more elements selected from Li, Na, Mg, K, Ca, Mn, Co, Ni, Cd, Ba, and the like. The metal impurities of any one or two or more elements selected from Li, Na, Mg, K, Ca, Mn, Co, Ni, Cd, Ba, and the like are present as ionic impurities, or as fine particles in an aggregated state or dispersed state.

In the method for producing ultrapure water of the present invention, (1) an ion exchanger-filled module filled with at least a monolithic organic porous anion exchanger is installed in a treatment path of the ultrapure water production apparatus, or (2) an ion exchanger-filled module filled with at least a monolithic organic porous anion exchanger is installed in a transfer path from the ultrapure water production apparatus to the use point. Hereinafter, the ion exchanger-filled module filled with at least a monolithic organic porous anion exchanger may also be simply referred to as an ion exchanger-filled module.

In the case of (1) above, a position to which the ion exchanger-filled module is installed is selected as appropriate depending on the module configuration of the ultrapure water production apparatus, but examples thereof include, for example, a transfer path of the treated water between the ultraviolet oxidation system and the non-regenerative cartridge polisher filled with an ion exchange resin, a transfer path of the treated water between the non-regenerative cartridge polisher filled with an ion exchange resin and the deaeration membrane apparatus, and a transfer path of the treated water between the deaeration membrane apparatus and the ultrafiltration membrane apparatus.

Figure 14:
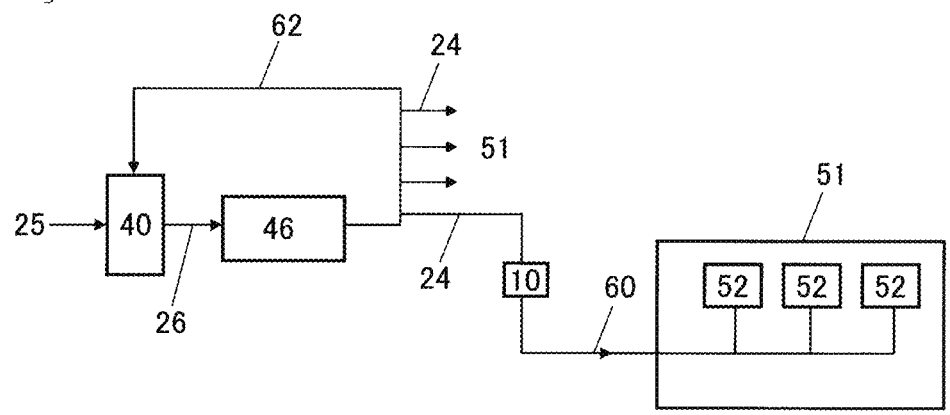
FIG. 14 is a schematic flow diagram for showing a position to which an ion exchanger-filled module is installed.
Figure 15:
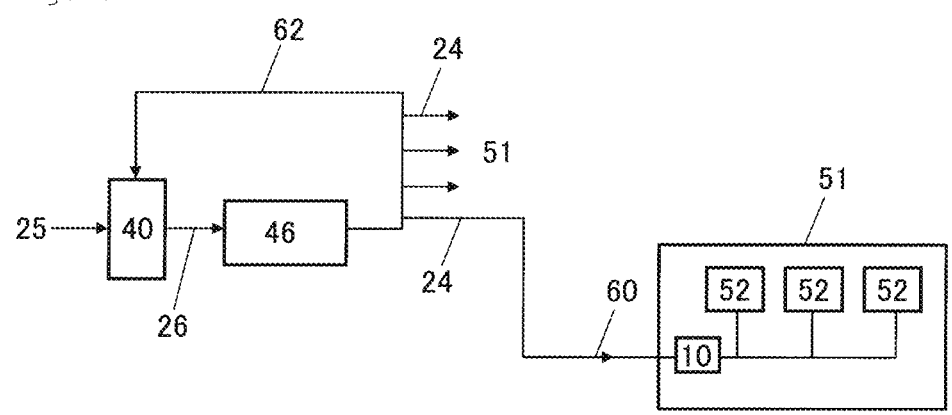
FIG. 15 is a schematic flow diagram for showing a position to which an ion exchanger-filled module is installed.
Figure 16:
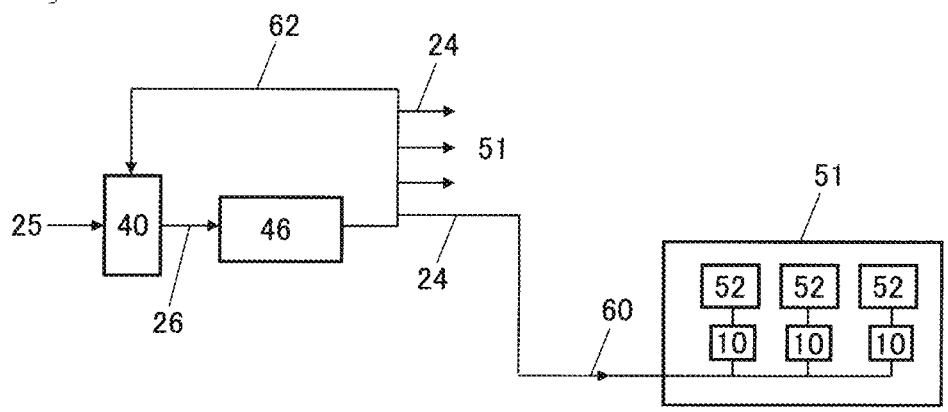
FIG. 16 is a schematic flow diagram for showing a position to which an ion exchanger-filled module is installed.

In the case of (2) above, examples thereof include, for example, exemplary embodiments shown in FIG. 14 to FIG. 16. FIG. 14 to FIG. 16 are schematic flow diagrams for showing positions to which the ion exchanger-filled module is installed. In FIG. 14 to FIG. 16, the ultrapure water (water to be treated) 24 from the secondary pure water production system 46 is supplied to each treatment chamber 52 of a substrate treatment apparatus 51. To a return pipe 62 from the secondary pure water production system (ultrapure water production apparatus) 46 to the primary pure water storage tank 40, one end of a pipe for transferring ultrapure water 60 is linked, and the pipe for transferring ultrapure water 60 extends to the inside of the substrate treatment apparatus 51 and is branched and linked to each treatment chamber 52 where the washing treatment for semiconductors is carried out. And, in the exemplary embodiment shown in FIG. 14, an ion exchanger-filled module 10 is installed in the middle of the pipe for transferring ultrapure water 60 from the return pipe 62 to the substrate treatment apparatus 51.

Alternatively, in the exemplary embodiment shown in FIG. 15, the ion exchanger-filled module 10 is installed in the middle of the pipe for transferring ultrapure water 60 extending to the inside of the substrate treatment apparatus 51. Also, in the exemplary embodiment shown in FIG. 16, the ion exchanger-filled module 10 is installed in each of the branched pipes from the pipe for transferring ultrapure water 60 to each treatment chamber 52 in the substrate treatment apparatus 51. As stated above, the ion exchanger-filled module is installed in a transfer path from the ultrapure water production apparatus to the use point.

And, in the method for producing ultrapure water of the present invention, in the case of (1) above, the water being transferred along the treatment path of the ultrapure water production apparatus is passed through and treated with the ion exchanger-filled module as the water to be treated, and the treated water is transferred to a module in the subsequent stage. Alternatively, in the method for producing ultrapure water of the present invention, in the case of (2) above, the water that has been treated with the ultrapure water production apparatus is passed through and treated with the ion exchanger-filled module as the water to be treated, and the treated water, ultrapure water, is transferred to the use point.

In the ion exchanger-filled module, although there is no particular limitation on the treatment conditions upon treating the water to be treated, the water passing speed SV is preferably 20000 $h^{-1}$ or less, more preferably 5 to 4000 $h^{-1}$, and particularly preferably 600 to 4000 $h^{-1}$. In addition, LV is preferably 100 m/h or less, more preferably 1 to 80 m/h, and particularly preferably 20 to 80 m/h. The method for producing ultrapure water of the present invention is highly effective in removing the same impurities as the elements mentioned above, even when the supply of water supplied to the use point is large. That is, the method for producing ultrapure water of the present invention is highly effective in removing the impurities of B, As, Al, Ti, Cr, Fe, Cu, Zn, Sn, V, Ga, and Pb mentioned above under the water passing conditions with a fast water passing speed where the water passing speed SV is 20000 $h^{-1}$ or less, more preferably 5 to 4000 $h^{-1}$, and particularly preferably 600 to 4000 $h^{-1}$, and LV is 100 m/h or less, more preferably 1 to 80 m/h, and particularly preferably 20 to 80 m/h.

The ion exchanger-filled module may be filled only with the monolithic organic porous anion exchanger, or it may be filled with a cation exchanger such as a particulate cation exchange resin or a monolithic organic porous cation exchanger in the foregoing stage, and the monolithic organic porous anion exchanger in the subsequent stage. Alternatively, it may also be filled with the monolithic organic porous anion exchanger in the foregoing stage and a monolithic organic porous cation exchanger in the subsequent stage. By using the monolithic organic porous anion exchanger in combination with a monolithic organic porous cation exchanger, elements that cannot be completely removed by the monolithic organic porous anion exchanger alone, such as Cd, can be removed almost completely. Also, when the foregoing stage of the ion exchanger-filled module is filled with a cation exchanger such as a particulate cation exchange resin or a monolithic organic porous cation exchanger and also the subsequent stage thereof is filled with the monolithic organic porous anion exchanger, upon treating the water to be treated, fine particles that may be generated in the particulate cation exchange resin or monolithic organic porous cation exchanger of the foregoing stage can be captured and removed by the monolithic organic porous anion exchanger of the subsequent stage. Examples of the embodiment of the ion exchanger-filled module into which a cation exchanger is filled in a stage preceding the monolithic organic porous anion exchanger include, for example, an ion exchanger-filled module into which two layers, a cation exchanger and the monolithic organic porous anion exchanger, are laminated and filled in this order from the side where water to be treated is supplied; and an ion exchanger-filled module into which four layers, a cation exchanger, the monolithic organic porous anion exchanger, a cation exchanger, and the monolithic organic porous anion exchanger are laminated and filled in this order from the side where water to be treated is supplied.

The ionic form of the monolithic organic porous anion exchanger filled into the ion exchanger-filled module is not particularly limited and examples thereof include the OH form, the $NO_3$ form, the Cl form, the $CO_3$ form, and the $HCO_3$ form. Among the above, the ionic form of the monolithic organic porous anion exchanger filled into the ion exchanger-filled module is preferably the OH form because the removal performance for impurity elements is high.

Examples of the ion exchanger-filled module include, for example, those having an ion exchanger filling cartridge filled with at least the monolithic organic porous anion exchanger, and a housing in which the ion exchanger filling cartridge is installed inside. The ion exchanger filling cartridge installed in the ion exchanger-filled module has a filling container into which the ion exchanger is filled and at least the monolithic organic porous anion exchanger. Also, in addition to the monolithic organic porous anion exchanger, the ion exchanger filling cartridge can have a cation exchanger such as a monolithic organic porous cation exchanger or a particulate cation exchange resin that is filled in a stage preceding the monolithic organic porous anion exchanger, or a monolithic organic porous cation exchanger that is filled in a stage subsequent to the monolithic organic porous anion exchanger.

Figure 1:
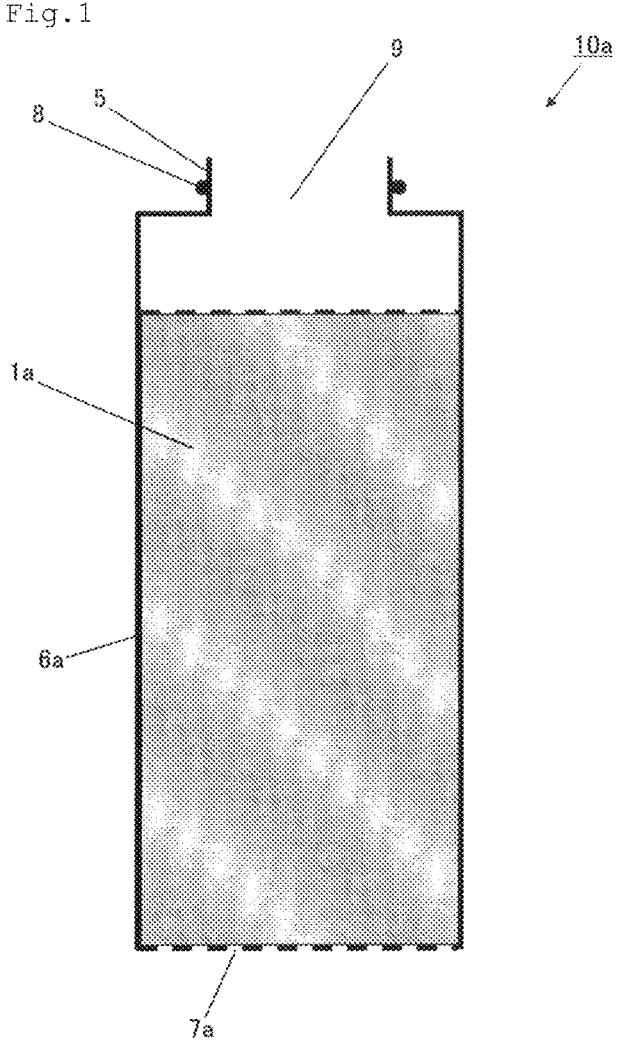
FIG. 1 is a schematic end view showing an exemplary embodiment of an ion exchanger filling cartridge according to the present invention.

Examples of the exemplary embodiment of the ion exchanger filling cartridge include, for example, an ion exchanger filling cartridge 10a shown in FIG. 1. The ion exchanger filling cartridge 10a has a cylindrical filling container 6a and a columnar monolithic organic porous anion exchanger 1a filled into the filling container 6a. A discharge port for treated water 9 is formed at one end of the filling container 6a on the side where treated water is discharged, and a supply port for water to be treated 7a is formed at the other end of the filling container 6a on the side where water to be treated is supplied. The discharge port for treated water 9 is provided with a connection part 5, which serves as a discharge path for the treated water and also as a connection portion to the housing, and a seal member 8 is attached to the outside of the connection part 5.

Figure 8:
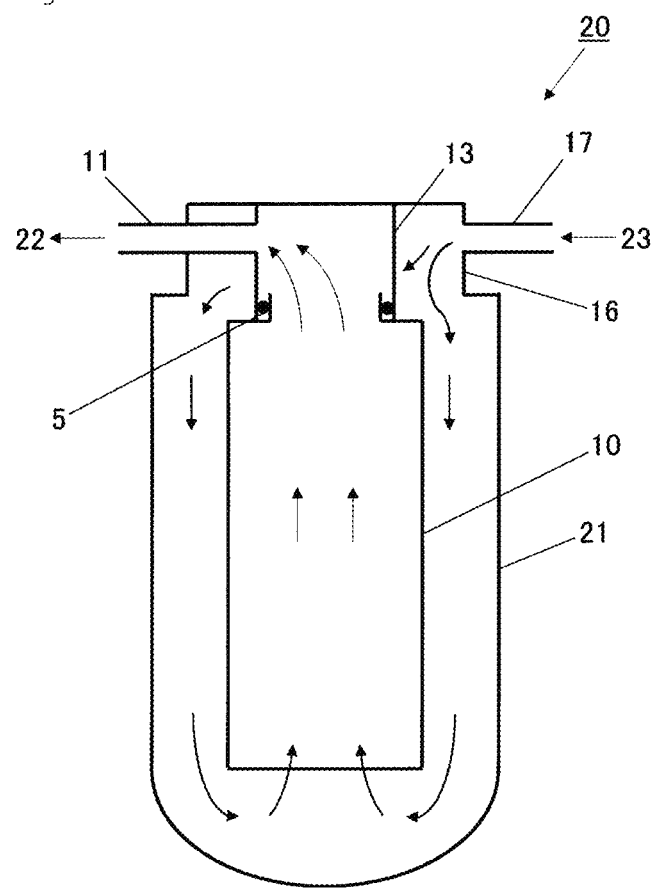
FIG. 8 is a schematic end view showing an exemplary embodiment of an ion exchanger-filled module according to the present invention.

Examples of the exemplary embodiment of the ion exchanger-filled module in which an ion exchanger filling cartridge is installed in a housing include, for example, an ion exchanger-filled module 20 shown in FIG. 8. The ion exchanger-filled module 20 shown in FIG. 8 comprises a housing 21 and an ion exchanger filling cartridge 10 installed in the housing 21. The housing 21 has a discharge inner pipe for treated water 13 to which a connection pipe for discharging treated water 11 is linked and to which a connection part 5 of the ion exchanger filling cartridge 10 is attached, and a supply outer pipe for water to be treated 16 to which a connection pipe for supplying water to be treated 17 is linked and into which water to be treated supplied to the housing 21 flows. And, in the ion exchanger-filled module 20, as shown by the arrows, water to be treated 23 is supplied from the connection pipe for supplying water to be treated 17, through the supply outer pipe for water to be treated 16, and into the ion exchanger-filled module 20, and then passed through the ion exchanger in the ion exchanger filling cartridge 10. Then, treated water 22 is discharged to the discharge inner pipe for treated water 13 and discharged outside the ion exchanger-filled module 20.

Figure 2:
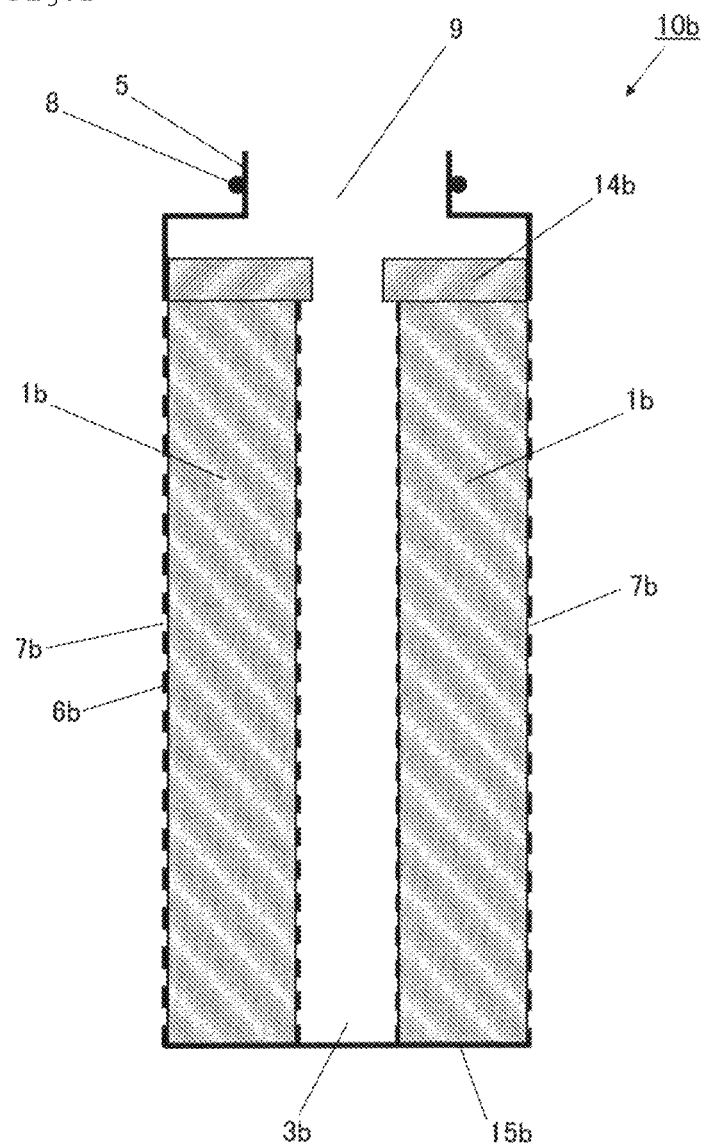
FIG. 2 is a schematic end view showing an exemplary embodiment of an ion exchanger filling cartridge according to the present invention.

In addition, examples of the exemplary embodiment of the ion exchanger filling cartridge include, for example, an ion exchanger filling cartridge 10b shown in FIG. 2. The ion exchanger filling cartridge 10b has a cylindrical filling container 6b and a cylindrical monolithic organic porous anion exchanger 1b, which is filled into the filling container 6b and has a columnar discharge space for treated water 3b formed inside thereof. A discharge port for treated water 9 is formed at one end of the filling container 6b on the side where treated water is discharged, and a supply port for water to be treated 7b is formed on the wall of a portion of the filling container 6b where the ion exchanger is filled. The discharge port for treated water 9 is provided with a connection part 5, which serves as a discharge path for the treated water and also as a connection portion to the housing, and a seal member 8 is attached to the outside of the connection part 5. One end of the cylindrical ion exchanger is sealed with a donut disc-shaped sealing member 14b, and the other end of the cylindrical ion exchanger is sealed with an end sealing part 15b of the filling container 6b.

Figure 3:
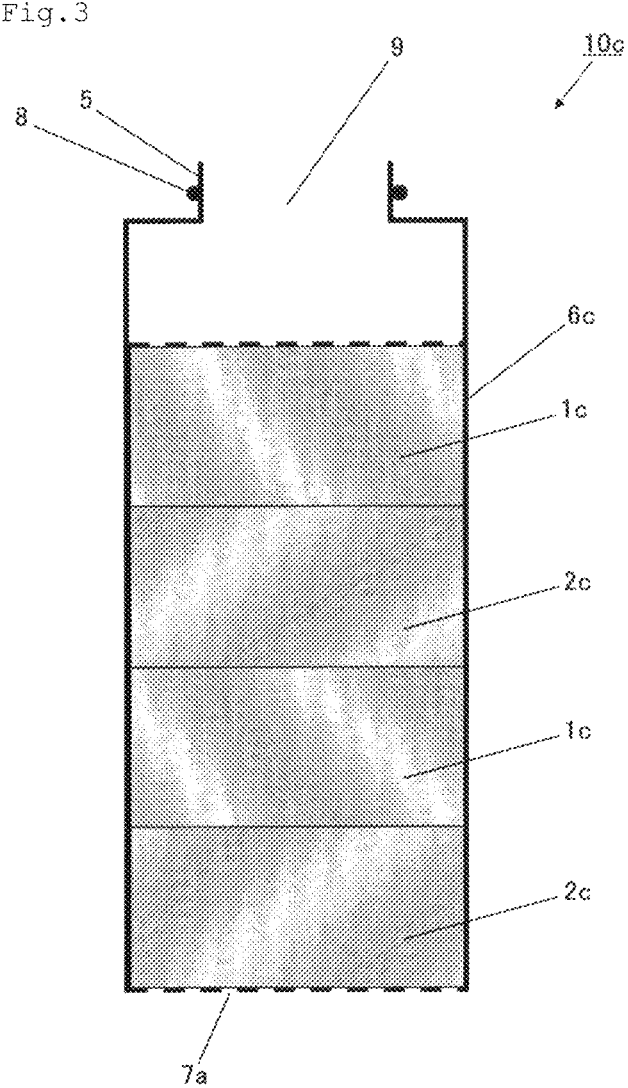
FIG. 3 is a schematic end view showing an exemplary embodiment of an ion exchanger filling cartridge according to the present invention.

In addition, examples of the exemplary embodiment of the ion exchanger filling cartridge include, for example, an ion exchanger filling cartridge 10c shown in FIG. 3. The ion exchanger filling cartridge 10c has a cylindrical filling container 6c and four layers of ion exchangers, a columnar monolithic organic porous cation exchanger 2c, a columnar monolithic organic porous anion exchanger 1c, a columnar monolithic organic porous cation exchanger 2c, and a columnar monolithic organic porous anion exchanger 1c that are laminated in this order from the side where water to be treated is supplied, and that are filled into the filling container 6c. A discharge port for treated water 9 is formed at one end of the filling container 6c on the side where treated water is discharged, and a supply port for water to be treated 7c is formed at the other end of the filling container 6c on the side where water to be treated is supplied. The discharge port for treated water 9 is provided with a connection part 5, which serves as a discharge path for the treated water and also as a connection portion to the housing, and a seal member 8 is attached to the outside of the connection part 5. Alternatively, examples of the ion exchanger filling cartridge also include those in which four layers, a columnar monolithic organic porous anion exchanger, a columnar monolithic organic porous cation exchanger, a columnar monolithic organic porous anion exchanger, and a columnar monolithic organic porous cation exchanger, are laminated in this order in the filling container 6c shown in FIG. 3.

Figure 4:
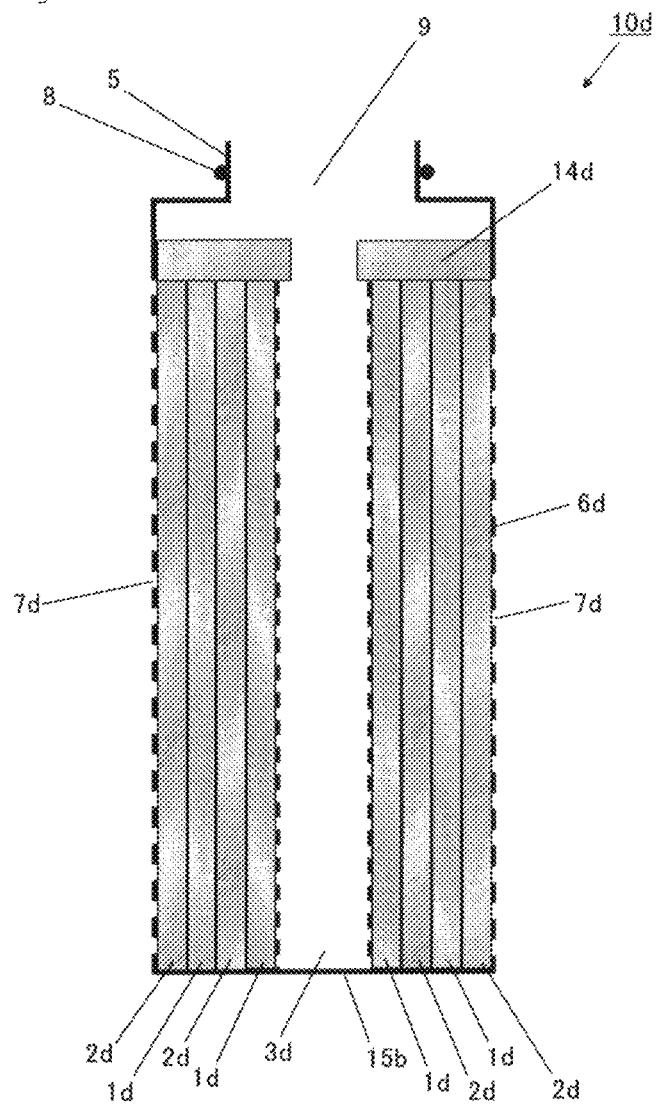
FIG. 4 is a schematic end view showing an exemplary embodiment of an ion exchanger filling cartridge according to the present invention.

In addition, examples of the exemplary embodiment of the ion exchanger filling cartridge include, for example, an ion exchanger filling cartridge 10d shown in FIG. 4. The ion exchanger filling cartridge 10d has a cylindrical filling container 6d and four layers of ion exchangers, a cylindrical monolithic organic porous cation exchanger 2d, a cylindrical monolithic organic porous anion exchanger 1d, a cylindrical monolithic organic porous cation exchanger 2d, and a cylindrical monolithic organic porous anion exchanger 1d that are filled into the filling container 6d, have a columnar discharge space for treated water 3d formed inside thereof, and are laminated and filled in this order. A discharge port for treated water 9 is formed at one end of the filling container 6d on the side where treated water is discharged, and a supply port for water to be treated 7d is formed on the wall of a portion of the filling container 6d where the ion exchanger is filled. The discharge port for treated water 9 is provided with a connection part 5, which serves as a discharge path for the treated water and also as a connection portion to the housing, and a seal member 8 is attached to the outside of the connection part 5. One end of the cylindrical ion exchanger is sealed with a donut disc-shaped sealing member 14d, and the other end of the cylindrical ion exchanger is sealed with an end sealing part 15d of the filling container 6d. Examples of the ion exchanger filling cartridge include those in which four layers, a cylindrical monolithic organic porous anion exchanger, a cylindrical monolithic organic porous cation exchanger, a cylindrical monolithic organic porous anion exchanger, and a cylindrical monolithic organic porous cation exchanger, are filled into the filling container 6d shown in FIG. 4, have a columnar discharge space for treated water formed inside thereof, and are laminated in this order.

Figure 5:
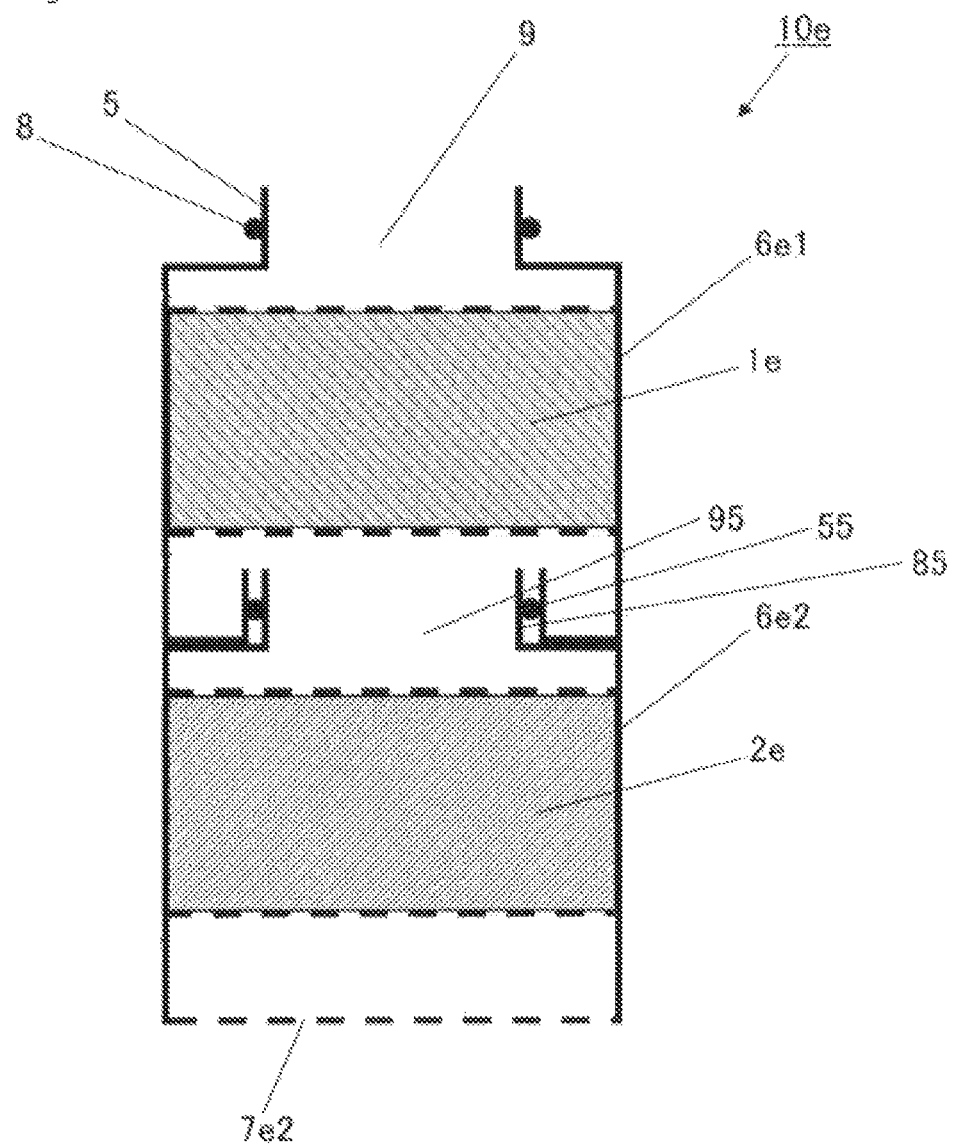
FIG. 5 is a schematic end view showing an exemplary embodiment of an ion exchanger filling cartridge according to the present invention.
Figure 6:
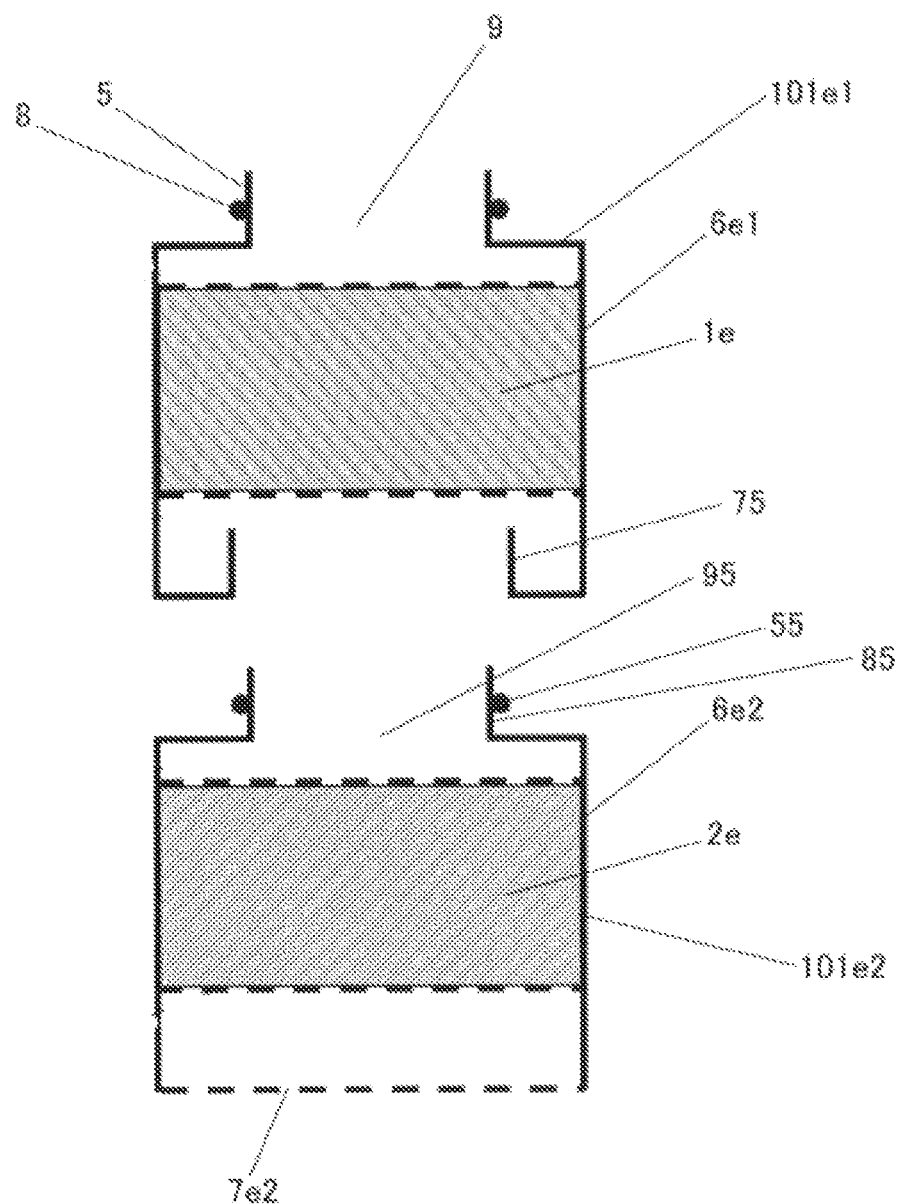
FIG. 6 is a schematic end view showing an exemplary embodiment of an ion exchanger filling cartridge according to the present invention.

In addition, examples of the exemplary embodiment of the ion exchanger filling cartridge include, for example, an ion exchanger filling cartridge 10e shown in FIG. 5. The ion exchanger filling cartridges 10e is formed by coupling a first cartridge split body 101e1 and a second cartridge split body 101e2 shown in FIG. 6. The first cartridge split body 101e1 has a cylindrical filling container 6e1 and a columnar monolithic organic porous anion exchanger 1e filled into the filling container 6e1. A discharge port for treated water 9 is formed at one end of the filling container 6e1 of the first cartridge split body 101e1 on the side where treated water is discharged, and the discharge port for treated water 9 is provided with a connection part 5, which serves as a discharge path for the treated water and also as a connection portion to the housing, and a seal member 8 is attached to the outside of the connection part 5. Also, at the other end of the filling container 6e1 of the first cartridge split body 101e1 on the side where water to be treated is supplied, an insertion part 75 is provided into which a coupling part 85 of the second cartridge split body 101e2 is inserted. The second cartridge split body 101e2 has a cylindrical filling container 6e2 and a columnar monolithic organic porous cation exchanger 2e filled into the filling container 6e2. A discharge port for treated water 95 is formed at one end of the filling container 6e2 of the second cartridge split body 101e2 on the side where treated water is discharged, and the discharge port for treated water 95 is provided with the coupling part 85, which serves as a coupling portion to the insertion part 75 of the first cartridge split body 101e1, and a seal member 55 is attached to the outside of the coupling part 85. Also, at the other end of the filling container 6e2 of the second cartridge split body 101e2 on the side where water to be treated is supplied, a supply port for water to be treated 7e2 is formed. And, the ion exchanger filling cartridge 10e is assembled by inserting the coupling part 85 of the second cartridge split body 101e2 into the insertion part 75 of the first cartridge split body 101e1, thereby coupling the first cartridge split body 101e1 and the second cartridge split body 101e2.

Figure 7:
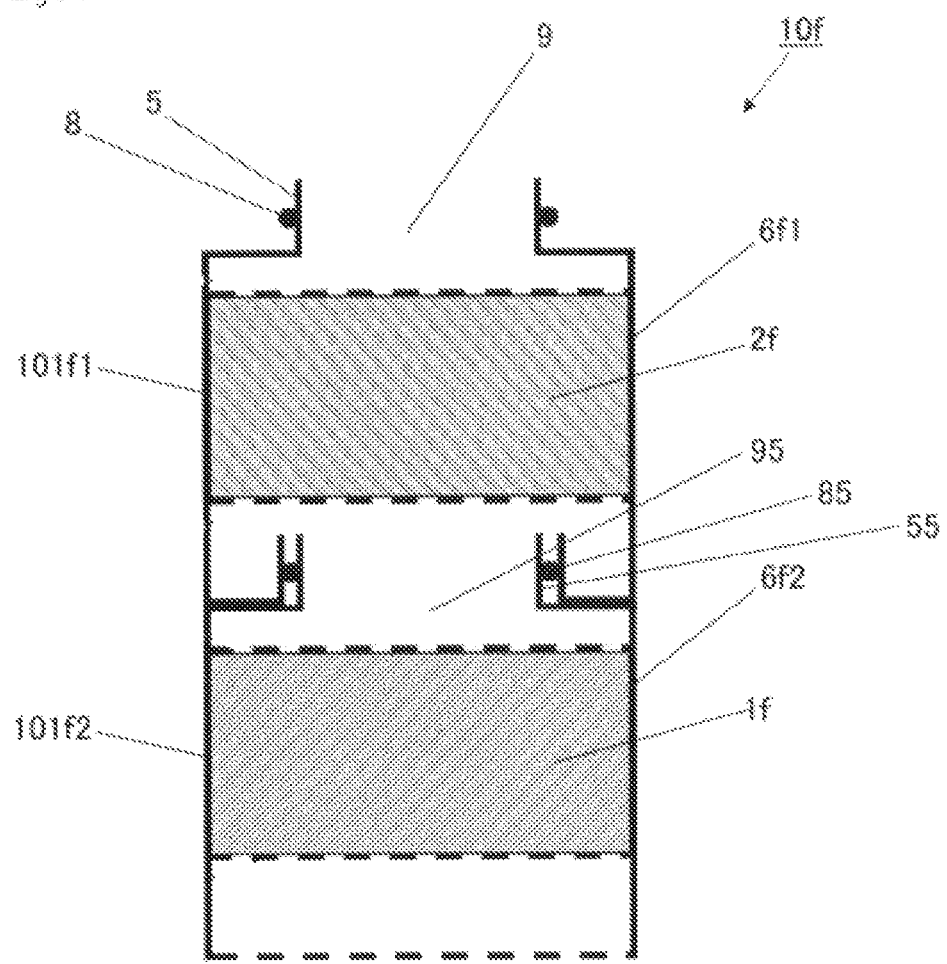
FIG. 7 is a schematic end view showing an exemplary embodiment of an ion exchanger filling cartridge according to the present invention.

In addition, examples of the exemplary embodiment of the ion exchanger filling cartridge include, for example, an ion exchanger filling cartridge 10f shown in FIG. 7. The ion exchanger filling cartridges 10f is formed by coupling a first cartridge split body 101f1 formed by filling a columnar monolithic organic porous cation exchanger 2f into a filling container 6f1 and a second cartridge split body 101f2 formed by filling a columnar monolithic organic porous anion exchanger 1f into a filling container 6f2. Note that the first cartridge split body 101f1 is obtained by replacing the monolithic organic porous anion exchanger 1e of the first cartridge split body 101e1 in FIG. 6 with the monolithic organic porous cation exchanger 2f, and the second cartridge split body 101f2 is obtained by replacing the monolithic organic porous cation exchanger 2e of the second cartridge split body 101e2 in FIG. 6 with the monolithic organic porous cation exchanger 1f.

When one filling container is filled with both a monolithic organic porous cation exchanger and a monolithic organic porous anion exchanger, the monolithic organic porous cation exchanger and the monolithic organic porous anion exchanger can only be washed by the same method. On the other hand, in the ion exchanger filling cartridge 10e and the ion exchanger filling cartridge 10f, upon washing, the split body filled with the monolithic organic porous cation exchanger and the split body filled with the monolithic organic porous cation exchanger can be divided, and the monolithic organic porous cation exchanger and the monolithic organic porous anion exchanger can each be washed by separate washing methods.

The monolithic organic porous anion exchanger filled into the ion exchanger-filled module is a porous material formed by introducing anion exchange groups into a monolithic organic porous material. The monolithic organic porous material according to the monolithic organic porous anion exchanger is a porous material that has a framework formed of an organic polymer, and has a number of communication holes in the framework that serve as flow channels for the reaction liquid. And, the monolithic organic porous anion exchanger is a porous material formed by introducing anion exchange groups into the framework of this monolithic organic porous material such that the anion exchange groups are uniformly distributed therein. Also, when a monolithic organic porous cation exchanger is filled into the ion exchanger-filled module, the monolithic organic porous cation exchanger is a porous material formed by introducing cation exchange groups into a monolithic organic porous material. The monolithic organic porous material according to the monolithic organic porous cation exchanger is a porous material that has a framework formed of an organic polymer, and has a number of communication holes in the framework that serve as flow channels for the reaction liquid. And, the monolithic organic porous cation exchanger is a porous material formed by introducing cation exchange groups into the framework of this monolithic organic porous material such that the cation exchange groups are uniformly distributed therein. Note that, in the present specification, the "monolithic organic porous material" may also be simply referred to as a "monolith", the "monolithic organic porous anion exchanger" may also be simply referred to as a "monolithic anion exchanger", and the "monolithic organic porous cation exchanger" may also be simply referred to as a "monolithic cation exchanger". Furthermore, a "monolithic organic porous intermediate (2)", which is an intermediate in the production of a second monolith (a precursor of the second monolith), may also be simply referred to as a "monolithic intermediate (2)".

In the method for producing ultrapure water of the present invention, the monolithic anion exchanger filled into the ion exchanger-filled module is obtained by introducing anion exchange groups into a monolith, the structure of which is an organic porous material comprising a continuous framework phase and a continuous pore phase, wherein the thickness of the continuous framework is 1 to 100 μm, the average diameter of the continuous pores is 1 to 1000 μm, and the total pore volume is 0.5 to 50 mL/g.

The thickness of the continuous framework of the monolithic anion exchanger in a dry state is 1 to 100 μm. When the thickness of the continuous framework of the monolithic anion exchanger is less than 1 μm, it is not preferable because there is not only a disadvantage such as a decrease in the anion exchange capacity per volume, but also a decrease in mechanical strength leading to a large deformation of the monolithic anion exchanger, especially when the liquid is passed through at a high flow rate. Furthermore, the contact efficiency between the reaction liquid and the monolithic anion exchanger is reduced, thereby reducing the catalytic activity, which is not preferable. On the other hand, when the thickness of the continuous framework of the monolithic anion exchanger is greater than 100 μm, it is not preferable because the framework becomes too thick and it takes more time for the substrate to be diffused, which reduces the catalytic activity. Note that the thickness of the continuous framework is determined by SEM observation.

The average diameter of the continuous pores of the monolithic anion exchanger in a dry state is 1 to 1000 μm. When the average diameter of the continuous pores of the monolithic anion exchanger is less than 1 μm, it is not preferable because the pressure loss upon passing water is high. On the other hand, when the average diameter of the continuous pores of the monolithic anion exchanger is greater than 1000 μm, it is not preferable because the contact between the liquid to be treated and the monolithic anion exchanger is insufficient, which reduces the removal performance. Note that the average diameter of the continuous pores of the monolithic anion exchanger in a dry state is measured by the mercury injection method and refers to the maximum value of the pore distribution curve obtained by the mercury injection method.

The total pore volume of the monolithic anion exchanger in a dry state is 0.5 to 50 mL/g. When the total pore volume of the monolithic anion exchanger is less than 0.5 mL/g, it is not preferable because the contact efficiency of the liquid to be treated is low, and furthermore, it is not preferable because the amount of permeate per unit cross sectional area is small, which reduces the throughput. On the other hand, when the total pore volume of the monolithic anion exchanger is greater than 50 mL/g, it is not preferable because the anion exchange capacity per volume is reduced, which reduces the removal performance. In addition, it is not preferable because the mechanical strength is decreased and the monolithic anion exchanger is largely deformed, especially when the liquid is passed through at a high speed, causing the pressure loss upon passing the liquid to rise rapidly. Note that the total pore volume is measured by the mercury injection method.

Exemplary structures of such a monolithic anion exchanger include the continuous bubble structures disclosed in Japanese Patent Laid-Open No. 2002-306976 and Japanese Patent Laid-Open No. 2009-62512, the co-continuous structure disclosed in Japanese Patent Laid-Open No. 2009-67982, the particle aggregated structure disclosed in Japanese Patent Laid-Open No. 2009-7550, and the particle composite structure disclosed in Japanese Patent Laid-Open No. 2009-108294.

The anion exchange capacity per volume of the monolithic anion exchanger in a water wet state is 0.1 to 1.0 mg equivalent/mL (water wet state). When the anion exchange capacity of the monolithic anion exchanger in a dry state is less than the range described above, it is not preferable because the amount of water to be treated before breakthrough is small and the frequency of replacement for the module is high. On the other hand, when it is greater than the range described above, it is not preferable because the pressure loss upon passing water is increased. Note that the anion exchange capacity of a porous material in which anion exchange groups are introduced only on the framework surface is at most 500 µg equivalent/g, although it is not possible to determine it in general, depending on the types of the porous material and anion exchange groups.

In the monolithic anion exchanger, the introduced anion exchange groups are uniformly distributed not only on the surface of the monolith, but also inside the framework of the monolith. The term "anion exchange groups are uniformly distributed" herein refers to the fact that the distribution of the anion exchange groups is such that they are uniformly distributed on the surface and inside the framework at least on the order of µm. The distribution of anion exchange groups can be easily confirmed by using EPMA. Also, when the anion exchange groups are uniformly distributed not only on the surface of the monolith but also inside the framework of the monolith, the physical properties and chemical properties of the surface and the inside can be made uniform, thus improving the resistance against swelling and shrinkage.

Examples of the anion exchange groups introduced into the monolithic anion exchanger include a quaternary ammonium group such as a trimethylammonium group, a triethylammonium group, a tributylammonium group, a dimethylhydroxyethylammonium group, a dimethylhydroxypropylammonium group, and a methyldihydroxyethylammonium group, a tertiary sulfonium group, and a phosphonium group.

In the monolithic anion exchanger, the material constituting the continuous framework is an organic polymer material having a crosslinked structure. Although the crosslinking density of the polymer material is not particularly limited, it is preferable to include 0.1 to 30 mol %, suitably 0.1 to 20 mol % of crosslinked structural units with respect to the entire constituent units that constitute the polymer material. When the crosslinked structural units are less than 0.1 mol %, it is not preferable because the mechanical strength is insufficient. On the other hand, when they are greater than 30 mol %, it is not preferable because the introduction of anion exchange groups may be difficult. There is no particular limitation on the type of the polymer material, and examples thereof include a crosslinked polymer, including, for example, an aromatic vinyl polymer such as polystyrene, poly(α-methylstyrene), polyvinyl toluene, polyvinylbenzyl chloride, polyvinyl biphenyl, and polyvinyl naphthalene; a polyolefin such as polyethylene and polypropylene; a poly(halogenated polyolefin) such as polyvinyl chloride and polytetrafluoroethylene; a nitrile-based polymer such as polyacrylonitrile; and a (meth)acrylic polymer such as polymethyl methacrylate, polyglycidyl methacrylate, and polyethyl acrylate. The polymers described above may be polymers obtained by copolymerizing a single vinyl monomer and a crosslinking agent, polymers obtained by polymerizing a plurality of vinyl monomers and a crosslinking agent, or a blend of two or more polymers. Among these organic polymer materials, crosslinked polymers of aromatic vinyl polymers are preferable because of the ease of forming a continuous structure, the ease of introducing anion exchange groups, the high mechanical strength, and the high stability against acids or alkalis, and in particular, styrene-divinylbenzene copolymers and vinylbenzyl chloride-divinylbenzene copolymers are preferable materials.

Exemplary Embodiments of Monolithic Organic Porous Anion Exchanger

Exemplary embodiments of the monolithic anion exchanger include the first monolithic anion exchanger and second monolithic anion exchanger, which will be shown below. In addition, exemplary embodiments of the monolith into which anion exchange groups are introduced include the first monolith and second monolith, which will be shown below.

<Description of First Monolith and First Monolithic Anion Exchanger>

The first monolithic anion exchanger is a monolithic anion exchanger having a continuous bubble structure with macropores linked to each other and common apertures (mesopores) with an average diameter of 1 to 1000 µm in a dry state within the walls of the macropores, having a total pore volume of 1 to 50 mL/g in a dry state, having anion exchange groups wherein the anion exchange groups are uniformly distributed, and having an anion exchange capacity per volume in a water wet state of 0.1 to 1.0 mg equivalent/mL (water wet state). In addition, the first monolith is a monolith before introducing the anion exchange groups, and is an organic porous material having a continuous bubble structure with macropores linked to each other and common apertures (mesopores) with an average diameter of 1 to 1000 µm in a dry state within the walls of the macropores, and having a total pore volume of 1 to 50 mL/g in a dry state.

Figure 9:
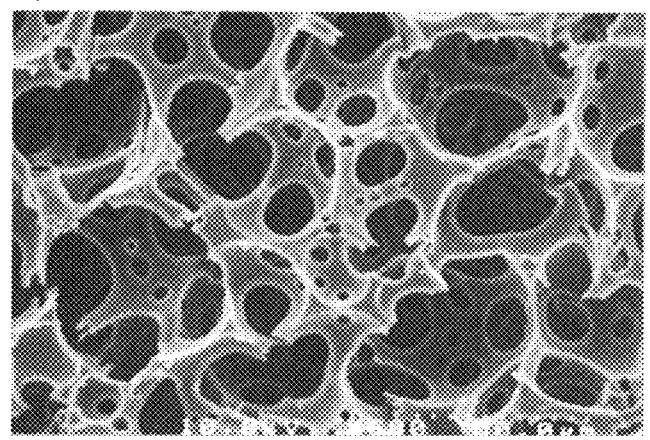
FIG. 9 is a scanning electron microscope (SEM) photograph of an exemplary embodiment of a first monolithic anion exchanger.

The first monolithic anion exchanger is a continuous macropore structural material in which bubble-like macropores overlap each other and these overlapping areas become common apertures (mesopores) with an average diameter of 1 to 1000 µm, preferably 10 to 200 µm, and particularly preferably 20 to 100 µm, in a dry state, the majority of which has an open pore structure. In the open pore structure, when the liquid flows, the flow channels are in the bubbles formed by the macropores and the mesopores. The number of overlaps between macropores is 1 to 12 for a single macropore and 3 to 10 for most. FIG. 9 shows a scanning electron microscope (SEM) photograph of an exemplary embodiment of the first monolithic anion exchanger. The first monolithic anion exchanger shown in FIG. 9 has a large number of bubble-like macropores, and is a continuous macropore structural material in which the bubble-like macropores overlap each other and these overlapping areas become common apertures (mesopores), the majority of which has an open pore structure. When the average diameter of the mesopores in a dry state is less than 1 µm, it is not preferable because the diffusibility of the liquid to be treated into the inside of the monolithic anion exchanger is low. On the other hand, when the average diameter of the mesopores in a dry state is greater than 1000 µm, it is not preferable because the contact between the liquid to be treated and the monolithic anion exchanger is insufficient, which reduces the removal performance. When the structure of the first monolithic anion exchanger is a continuous bubble structure as described above, groups of macropores and mesopores can be formed uniformly, and the pore volume and specific surface area can also be made significantly larger than those of particle aggregated porous materials as described in Japanese Patent Laid-Open No. 8-252579 and the like.

Note that, in the present invention, the average diameter of the apertures of the first monolith in a dry state and the average diameter of the apertures of the first monolithic anion exchanger in a dry state are measured by the mercury injection method and refer to the maximum value of the pore distribution curve obtained by the mercury injection method.

The total pore volume per weight of the first monolithic anion exchanger in a dry state is 1 to 50 mL/g, and suitably 2 to 30 mL/g. When the total pore volume is less than 1 mL/g, it is not preferable because the contact efficiency of the liquid to be treated is low, and furthermore, it is not preferable because the amount of permeate per unit cross sectional area is small, which reduces the throughput capacity. On the other hand, when the total pore volume is greater than 50 mL/g, it is not preferable because the mechanical strength is decreased and the monolithic anion exchanger is largely deformed, especially when the liquid is passed through at a high flow rate. Furthermore, the contact efficiency between the liquid to be treated and the monolithic anion exchanger is reduced, thereby also reducing the removal performance, which is not preferable. Since the total pore volume of conventional particulate porous anion exchange resins is 0.1 to 0.9 ml/g at most, those with a high pore volume of 1 to 50 ml/g and a high specific surface area, which have not been available in the past, can be used.

In the first monolithic anion exchanger, the material constituting the framework is an organic polymer material having a crosslinked structure. Although the crosslinking density of that polymer material is not particularly limited, it is preferable to include 0.3 to 10 mol %, suitably 0.3 to 5 mol % of crosslinked structural units with respect to the entire constituent units that constitute the polymer material. When the crosslinked structural units are less than 0.3 mol %, it is not preferable because the mechanical strength is insufficient. On the other hand, when they are greater than 10 mol %, it is not preferable because the introduction of anion exchange groups may be difficult.

There is no particular limitation on the type of the organic polymer material constituting the framework of the first monolithic anion exchanger, and examples thereof include a crosslinked polymer, including, for example, an aromatic vinyl polymer such as polystyrene, poly(α-methylstyrene), polyvinyl toluene, polyvinylbenzyl chloride, polyvinyl biphenyl, and polyvinyl naphthalene; a polyolefin such as polyethylene and polypropylene; a poly(halogenated polyolefin) such as polyvinyl chloride and polytetrafluoroethylene; a nitrile-based polymer such as polyacrylonitrile; and a (meth)acrylic polymer such as polymethyl methacrylate, polyglycidyl methacrylate, and polyethyl acrylate. The organic polymers described above may be polymers obtained by copolymerizing a single vinyl monomer and a crosslinking agent, polymers obtained by polymerizing a plurality of vinyl monomers and a crosslinking agent, or a blend of two or more polymers. Among these organic polymer materials, crosslinked polymers of aromatic vinyl polymers are preferable because of the ease of forming a continuous macropore structure, the ease of introducing anion exchange groups, the high mechanical strength, and the high stability against acids or alkalis, and in particular, styrene-divinylbenzene copolymers and vinylbenzyl chloride-divinylbenzene copolymers are preferable materials.

Examples of the anion exchange groups introduced into the first monolithic anion exchanger include a quaternary ammonium group such as a trimethylammonium group, a triethylammonium group, a tributylammonium group, a dimethylhydroxyethylammonium group, a dimethylhydroxypropylammonium group, and a methyldihydroxyethylammonium group, a tertiary sulfonium group, and a phosphonium group. The anion exchange groups introduced into the first monolithic anion exchanger are the same in the second monolithic anion exchanger.

In the first monolithic anion exchanger (the same applies to the second monolithic anion exchanger), the introduced anion exchange groups are uniformly distributed not only on the surface of the porous material, but also inside the framework of the porous material. The term "anion exchange groups are uniformly distributed" herein refers to the fact that the distribution of the anion exchange groups is such that they are uniformly distributed on the surface and inside the framework at least on the order of μm. The distribution of anion exchange groups can be confirmed by using EPMA. Also, when the anion exchange groups are uniformly distributed not only on the surface of the monolith but also inside the framework of the porous material, the physical properties and chemical properties of the surface and the inside can be made uniform, thus improving the resistance against swelling and shrinkage.

The anion exchange capacity per volume of the first monolithic anion exchanger in a water wet state is 0.1 to 1.0 mg equivalent/mL (water wet state). When the anion exchange capacity per volume in a water wet state is in the range described above, the removal performance is high and the service life is long. Note that the anion exchange capacity of a porous material in which anion exchange groups are introduced only on the surface is at most 500 μg equivalent/g, although it is not possible to determine it in general, depending on the types of the porous material and anion exchange groups.

<Method for Producing First Monolith and First Monolithic Anion Exchanger>

Although there is no limitation on the method for producing the first monolith, an example of the production method, according to the method described in Japanese Patent Laid-Open No. 2002-306976, is shown below. That is, the first monolith is obtained by mixing an oil soluble monomer without ion exchange groups, a surfactant, water and, if required, a polymerization initiator, to obtain a water in oil type emulsion, which is then polymerized to form the monolith. Such a method for producing the first monolith is preferable because of the ease of controlling the porous structure of the monolith.

The oil soluble monomer without ion exchange groups used in the production of the first monolith refers to a monomer that does not contain either cation exchange groups such as carboxylic acid groups or sulfonic acid groups or anion exchange groups such as quaternary ammonium groups, and that has low solubility in water and is lipophilic. Specific examples of such a monomer include styrene, α-methylstyrene, vinyl toluene, vinylbenzyl chloride, divinylbenzene, ethylene, propylene, isobutene, butadiene, isoprene, chloroprene, vinyl chloride, vinyl bromide, vinylidene chloride, tetrafluoroethylene, acrylonitrile, methacrylonitrile, vinyl acetate, methyl acrylate, ethyl acrylate, butyl acrylate, 2-ethylhexyl acrylate, trimethylolpropane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers may be used alone as one kind, or may be used in combination of two or more kinds. However, in the present invention, it is preferable to select a crosslinkable monomer such as divinylbenzene or ethylene glycol dimethacrylate as at least one component of the oil soluble monomer and set the content thereof to 0.3 to 10 mol %, or suitably 0.3 to 5 mol %, of the entire oil soluble monomers in that anion exchange groups can be introduced quantitatively in the subsequent step and a practically sufficient mechanical strength can be ensured.

The surfactant used in the production of the first monolith is not particularly limited as long as it is capable of forming a water in oil type (W/O) emulsion when mixed with an oil soluble monomer without ion exchange groups and water. Examples of the surfactant that can be used include a non-cationic surfactant such as sorbitan monooleate, sorbitan monolaurate, sorbitan monopalmitate, sorbitan monostearate, sorbitan trioleate, polyoxyethylene nonylphenyl ether, polyoxyethylene stearyl ether, and polyoxyethylene sorbitan monooleate; a negative cationic surfactant such as potassium oleate, sodium dodecylbenzene sulfonate, sodium dioctyl sulfosuccinate; a positive cationic surfactant such as distearyl dimethyl ammonium chloride; and an amphoteric surfactant such as lauryl dimethyl betaine. These surfactants may be used alone as one kind or may be used in combination of two or more kinds. Note that a water in oil type emulsion refers to an emulsion in which the oil phase becomes a continuous phase and water droplets are dispersed therein. As for the amount of the surfactant to be added, it is difficult to say in general because it varies significantly depending on the type of oil soluble monomer and the size of the target emulsion particles (macropores), but it can be selected in the range of about 2 to 70% with respect to the total amount of the oil soluble monomer and the surfactant. Also, in order to control the bubble shape and size of the monolith, although it is not necessarily required, an alcohol such as methanol or stearyl alcohol; a carboxylic acid such as stearic acid; a hydrocarbon such as octane, dodecane, or toluene; or a cyclic ether such as tetrahydrofuran or dioxane may coexist in the system.

In addition, in the production of the first monolith, upon forming the monolith by polymerization, a compound that generates radicals by heat and light irradiation is suitably used as the polymerization initiator that is used if required. The polymerization initiator may be water soluble or oil soluble, and examples thereof include, for example, azobisisobutyronitrile, azobisdimethylvaleronitrile, azobiscyclohexanenitrile, azobiscyclohexanecarbonitrile, benzoyl peroxide, potassium persulfate, ammonium persulfate, hydrogen peroxide-ferrous chloride, sodium persulfate-sodium hydrogen sulfite, tetramethylthiuram disulfide. However, in some systems, polymerization proceeds only by heating or light irradiation without the addition of a polymerization initiator, and therefore the addition of a polymerization initiator is not necessary in such systems.

In the production of the first monolith, there is no limitation on the mixing method upon mixing an oil soluble monomer without ion exchange groups, a surfactant, water, and a polymerization initiator to form a water in oil type emulsion. For example, a method in which all components are mixed at once, or a method in which oil soluble components, including an oil soluble monomer, a surfactant, and an oil soluble polymerization initiator, and water soluble components, including water and a water soluble polymerization initiator, are separately dissolved to be uniform, and then these components are mixed together can be used. There is no particular limitation on the mixing apparatus for forming an emulsion, either. For example, an ordinary mixer, homogenizer, high pressure homogenizer, or so-called planetary stirring apparatus, which mixes the objects to be treated by placing them in a mixing vessel and allowing the vessel to rotate on its axis while making the vessel inclined and revolving around the revolution axis can be used, and an appropriate apparatus may be selected to obtain the target emulsion particle diameter. Also, there is no particular limitation on the mixing conditions, and the stirring speed and stirring time at which the target emulsion particle diameter can be obtained can be arbitrarily set. Among these mixing apparatuses, the planetary stirring apparatus is preferably used because it can uniformly produce water droplets in the W/O emulsion and its average diameter can be arbitrarily set over a wide range.

In the production of the first monolith, as for the polymerization conditions under which the water in oil type emulsion thus obtained is polymerized, a variety of conditions can be selected depending on the type of monomer and the initiator system. For example, when azobisisobutyronitrile, benzoyl peroxide, potassium persulfate, or the like is used as the polymerization initiator, heat polymerization may be performed at 30 to 100° C. for 1 to 48 hours in a sealed container under an inert atmosphere, and when hydrogen peroxide-ferrous chloride, sodium persulfate-sodium hydrogen sulfite, or the like is used as the initiator, polymerization may be performed at 0 to 30° C. for 1 to 48 hours in a sealed container under an inert atmosphere. After the completion of polymerization, the contents are taken out and soxhlet extracted with a solvent such as isopropanol to remove the unreacted monomer and residual surfactant, thereby obtaining the first monolith.

There is no particular limitation on the method for producing the first monolithic anion exchanger, and examples thereof include a method in which, instead of the monomer without ion exchange groups in the method for producing the first monolith described above, a monomer with anion exchange groups, such as a monomer formed by introducing anion exchange groups, such as monomethylammonium, dimethylammonium groups, and trimethylammonium groups into the oil soluble monomer without ion exchange groups described above, is polymerized to form a monolithic anion exchanger in one step, and a method in which a monomer without ion exchange groups is used and polymerized to form the first monolith and anion exchange groups are then introduced thereinto. Among these methods, the method in which a monomer without ion exchange groups is used and polymerized to form the first monolith and anion exchange groups are then introduced thereinto is preferable because the porous structure of the monolithic anion exchanger can be easily controlled and anion exchange groups can also be introduced quantitatively.

There is no particular limitation on the method for introducing anion exchange groups into the first monolith, and a known method such as polymer reaction or graft polymerization can be used. For example, examples of the method for introducing quaternary ammonium groups include: a method in which, when the monolith is a styrene-divinylbenzene copolymer or the like, chloromethyl groups are introduced using chloromethyl methyl ether or the like, and then the monolith is allowed to react with a tertiary amine; a method in which chloromethylstyrene and divinylbenzene are copolymerized to produce a monolith, which is then allowed to react with a tertiary amine; a method in which radical initiation groups or chain transfer groups are uniformly introduced into the monolith on the framework surface and inside the framework, and N,N,N-trimethylammonium ethyl acrylate or N,N,N-trimethylammonium propyl acrylamide is graft polymerized; and a method in which glycidyl methacrylate is graft polymerized in the same manner, and then quaternary ammonium groups are introduced by functional group transformation. Among these methods, as the method for introducing quaternary ammonium groups, the method in which chloromethyl groups are introduced into a styrene-divinylbenzene copolymer using chloromethyl methyl ether or the like, and then the monolith is allowed to react with a tertiary amine, or the method in which chloromethylstyrene and divinylbenzene are copolymerized to produce a monolith, which is then allowed to react with a tertiary amine is preferable in that ion exchange groups can be introduced uniformly and quantitatively. Note that examples of the ion exchange groups to be introduced include a quaternary ammonium group such as a trimethylammonium group, a triethylammonium group, a tributylammonium group, a dimethylhydroxyethylammonium group, a dimethylhydroxypropylammonium group, and a methyldihydroxyethylammonium group, a tertiary sulfonium group, and a phosphonium group.

<Description of Second Monolith and Second Monolithic Anion Exchanger>

The second monolithic anion exchanger is a co-continuous structural material formed of a three dimensionally continuous framework comprising an aromatic vinyl polymer containing 0.1 to 5.0 mol % of crosslinked structural units among the entire constituent units, with an average thickness of 1 to 60 μm in a dry state, and three dimensionally continuous pores in the framework with an average diameter of 10 to 200 μm in a dry state; has a total pore volume of 0.5 to 10 mL/g in a dry state; has anion exchange groups; has an anion exchange capacity per volume in a water wet state of 0.2 to 1.0 mg equivalent/mL (water wet state); and is a monolithic anion exchanger in which the anion exchange groups are uniformly distributed in the organic porous anion exchanger. In addition, the second monolith is a monolith before introducing the anion exchange groups, and is a co-continuous structural material formed of a three dimensionally continuous framework comprising an aromatic vinyl polymer containing 0.1 to 5.0 mol % of crosslinked structural units among the entire constituent units, with an average thickness of 1 to 60 μm in a dry state, and three dimensionally continuous pores in the framework with an average diameter of 10 to 200 μm in a dry state; and is an organic porous material with a total pore volume of 0.5 to 10 mL/g in a dry state.

Figure 10:
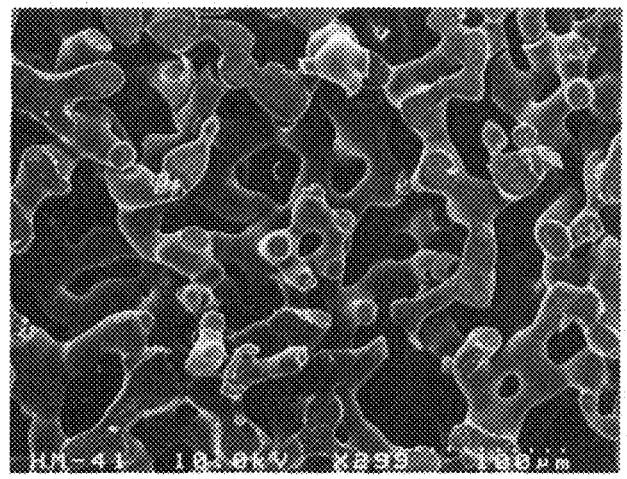
FIG. 10 is a SEM photograph of an exemplary embodiment of a second monolithic anion exchanger.
Figure 11:
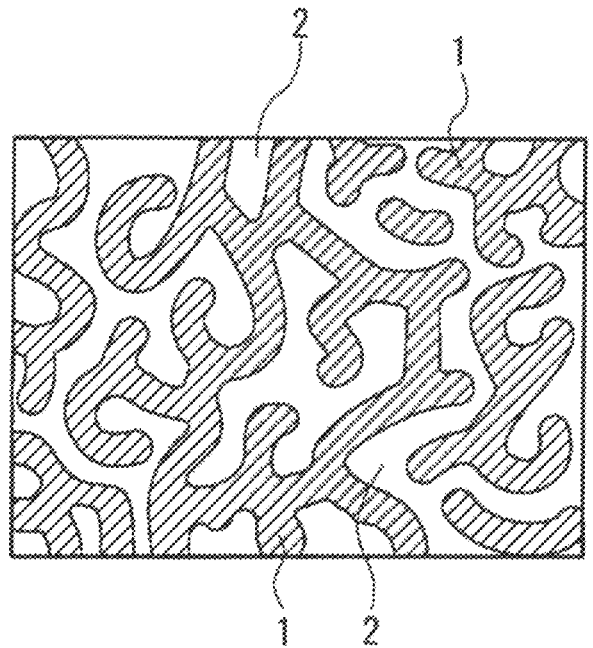
FIG. 11 is a schematic diagram of the co-continuous structure of the second monolithic anion exchanger.

The second monolithic anion exchanger is a co-continuous structural material formed of a three dimensionally continuous framework with an average thickness of 1 to 60 μm, preferably 3 to 58 μm, in a dry state, and three dimensionally continuous pores in the framework with an average diameter of 10 to 200 μm, preferably 15 to 180 μm, and particularly preferably 20 to 150 μm, in a dry state. FIG. 10 shows a SEM photograph of an exemplary embodiment of the second monolithic anion exchanger, and FIG. 11 illustrates a schematic diagram of the co-continuous structure of the second monolithic anion exchanger. The co-continuous structure is a structure 10 in which a continuous framework phase 1 and a continuous pore phase 2 are intertwined and are both three dimensionally continuous, as illustrated in the schematic diagram of FIG. 11. These continuous pores 2 have a higher degree of continuity of pores and have less deviation in their size than conventional continuous bubble monoliths and particle aggregated monoliths. In addition, the mechanical strength is high due to the thick framework.

When the average diameter of the three dimensionally continuous pores in a dry state is less than 10 μm, it is not preferable because the liquid to be treated is difficult to be diffused. On the other hand, when it is greater than 200 μm, it is not preferable because the contact between the liquid to be treated and the monolithic anion exchanger is insufficient, which results in insufficient removal performance. Also, when the average thickness of the framework is less than 1 μm in the dry state, it is not preferable because the anion exchange capacity is low and the mechanical strength is also low. Furthermore, the contact efficiency between the reaction liquid and the monolithic anion exchanger is reduced, thereby reducing the removal performance, which is not preferable. On the other hand, when the thickness of the framework is greater than 60 μm, it is not preferable because the framework becomes too thick and diffusion of the liquid to be treated becomes nonuniform.

The average diameter of the apertures of the second monolith in a dry state, the average diameter of the apertures of the second monolithic anion exchanger in a dry state, and the average diameter of the apertures of a second monolithic intermediate (2) in a dry state, which is obtained in a step I of the production of the second monolith, which will be mentioned later, are determined by the mercury injection method and refer to the maximum value of the pore distribution curve obtained by the mercury injection method. Also, the average thickness of the framework of the second monolithic anion exchanger in a dry state is determined by SEM observation of the second monolithic anion exchanger in a dry state. Specifically, SEM observations of the second monolithic anion exchanger in a dry state are performed at least three times, and the thickness of the framework in the obtained images is measured, and the average value thereof is defined as the average thickness. Note that the framework is rod-shaped and has a circular cross sectional shape, but it may also include one with a different diameter cross section, such as an oval cross sectional shape. In this case, the thickness is the average of the short and long diameters.

In addition, the total pore volume per weight of the second monolithic anion exchanger in a dry state is 0.5 to 10 mL/g. When the total pore volume is less than 0.5 mL/g, it is not preferable because the contact efficiency of the substrate or the solvent is low, and furthermore, it is not preferable because the amount of permeate per unit cross sectional area is small, which reduces the throughput. On the other hand, when the total pore volume is greater than 10 ml/g, the contact efficiency between the liquid to be treated and the monolithic anion exchanger is reduced, thereby reducing the removal performance, which is not preferable. When the size and total pore volume of the three dimensionally continuous pores are within the ranges described above, the contact with the liquid to be treated is extremely uniform and the contact area is large.

In the second monolithic anion exchanger, the material constituting the framework is an aromatic vinyl polymer including 0.1 to 5 mol %, preferably 0.5 to 3.0 mol % of crosslinked structural units among the entire constituent units, and is hydrophobic. When the crosslinked structural units are less than 0.1 mol %, it is not preferable because the mechanical strength is insufficient. On the other hand, when they are greater than 5 mol %, the structure of the porous material easily deviates from the co-continuous structure. There is no particular limitation on the type of the aromatic vinyl polymer, and examples thereof include, for example, polystyrene, poly(α-methylstyrene), polyvinyl toluene, polyvinylbenzyl chloride, polyvinyl biphenyl, and polyvinyl naphthalene. The polymers described above may be polymers obtained by copolymerizing a single vinyl monomer and a crosslinking agent, polymers obtained by polymerizing a plurality of vinyl monomers and a crosslinking agent, or a blend of two or more polymers. Among these organic polymer materials, styrene-divinylbenzene copolymers and vinylbenzyl chloride-divinylbenzene copolymers are preferable because of the ease of forming a co-continuous structure, the ease of introducing anion exchange groups, the high mechanical strength, and the high stability against acids or alkalis.

The anion exchange groups introduced into the second monolithic anion exchanger are the same as the anion exchange groups introduced into the first monolithic anion exchanger.

In the second monolithic anion exchanger, the introduced anion exchange groups are uniformly distributed not only on the surface of the porous material, but also inside the framework of the porous material.

The second monolithic anion exchanger has an anion exchange capacity per volume in a water wet state of 0.2 to 1.0 mg equivalent/mL (water wet state). The second monolithic anion exchanger has a high degree of continuity and uniformity of three dimensionally continuous pores, which allows for uniform diffusion of the substrate and solvent. Therefore, the reaction proceeds quickly. When the anion exchange capacity is in the range described above, the removal performance is high and the service life is long.

<Method for Producing Second Monolith and Second Monolithic Anion Exchanger>

The second monolith is obtained by carrying out the following steps: stirring a mixture of an oil soluble monomer without ion exchange groups, a surfactant, and water, thereby preparing a water in oil type emulsion, and then polymerizing the water in oil type emulsion to obtain a monolithic organic porous intermediate (hereinafter, also referred to as a monolithic intermediate (2)) having a continuous macropore structure with a total pore volume of greater than 16 mL/g and not more than 30 mL/g (a step I); preparing a mixture formed of an aromatic vinyl monomer, a crosslinking agent at 0.3 to 5 mol % among the entire oil soluble monomers having at least two or more vinyl groups in one molecule, an organic solvent that dissolves the aromatic vinyl monomer and the crosslinking agent, but does not dissolve a polymer produced by polymerization of the aromatic vinyl monomer, and a polymerization initiator (a step II); polymerizing the mixture obtained in the step II while leaving it to stand still and in the presence of the monolithic intermediate (2) obtained in the step I, thereby obtaining a second monolith, which is an organic porous material with a co-continuous structure (a step III).

In the step I according to the method for producing the second monolith, the step I of obtaining the monolithic intermediate (2) may be carried out in accordance with the method described in Japanese Patent Laid-Open No. 2002-306976.

That is, in the step I according to the method for producing the second monolith, examples of the oil soluble monomer without ion exchange groups include, for example, a monomer that does not contain ion exchange groups such as carboxylic acid groups, sulfonic acid groups, tertiary amino groups, and quaternary ammonium groups, and that has low solubility in water and is lipophilic. Specific examples of such a monomer include an aromatic vinyl monomer such as styrene, α-methylstyrene, vinyl toluene, vinylbenzyl chloride, vinyl biphenyl, and vinyl naphthalene; an α-olefin such as ethylene, propylene, 1-butene, and isobutene; a diene-based monomer such as butadiene, isoprene, and chloroprene; a halogenated olefin such as vinyl chloride, vinyl bromide, vinylidene chloride, and tetrafluoroethylene; a nitrile-based monomer such as acrylonitrile and methacrylonitrile; a vinyl ester such as vinyl acetate and vinyl propionate; and a (meth)acrylic monomer such as methyl acrylate, ethyl acrylate, butyl acrylate, 2-ethylhexyl acrylate, methyl methacrylate, ethyl methacrylate, propyl methacrylate, butyl methacrylate, 2-ethylhexyl methacrylate, cyclohexyl methacrylate, benzyl methacrylate, and glycidyl methacrylate. Among these monomers, the aromatic vinyl monomer is suitable, and examples thereof include styrene, α-methylstyrene, vinyl toluene, vinylbenzyl chloride, and divinylbenzene. These monomers may be used alone as one kind, or may be used in combination of two or more kinds. However, it is preferable to select a crosslinkable monomer such as divinylbenzene or ethylene glycol dimethacrylate as at least one component of the oil soluble monomer and set the content thereof to 0.3 to 5 mol %, or suitably 0.3 to 3 mol %, of the entire oil soluble monomers because it is advantageous for the formation of a co-continuous structure.

The surfactant used in the step I according to the method for producing the second monolith is not particularly limited as long as it is capable of forming a water in oil type (W/O) emulsion when mixed with an oil soluble monomer without anion exchange groups and water. Examples of the surfactant that can be used include a non-cationic surfactant such as sorbitan monooleate, sorbitan monolaurate, sorbitan monopalmitate, sorbitan monostearate, sorbitan trioleate, polyoxyethylene nonylphenyl ether, polyoxyethylene stearyl ether, and polyoxyethylene sorbitan monooleate; a negative cationic surfactant such as potassium oleate, sodium dodecylbenzene sulfonate, sodium dioctyl sulfosuccinate; a positive cationic surfactant such as distearyl dimethyl ammonium chloride; and an amphoteric surfactant such as lauryl dimethyl betaine. These surfactants may be used alone as one kind or may be used in combination of two or more kinds. Note that a water in oil type emulsion refers to an emulsion in which the oil phase becomes a continuous phase and water droplets are dispersed therein. As for the amount of the surfactant to be added, it is difficult to say in general because it varies significantly depending on the type of oil soluble monomer and the size of the target emulsion particles (macropores), but it can be selected in the range of about 2 to 70% with respect to the total amount of the oil soluble monomer and the surfactant.

In addition, in the step I according to the method for producing the second monolith, a polymerization initiator may be used, if required, upon forming the water in oil type emulsion. As the polymerization initiator, a compound that generates radicals by heat or light irradiation is suitably used. The polymerization initiator may be water soluble or oil soluble, and examples thereof include, for example, 2,2'-azobis(isobutyronitrile), 2,2'-azobis(2,4-dimethylvaleronitrile), 2,2'-azobis(2-methylbutyronitrile), 2,2'-azobis(4-methoxy-2,4-dimethylvaleronitrile), dimethyl 2,2'-azobis (isobutyrate), 4,4'-azobis(4-cyanovaleric acid), 1,1'-azobis (cyclohexane-1-carbonitrile), benzoyl peroxide, lauroyl peroxide, potassium persulfate, ammonium persulfate, tetramethylthiuram disulfide, hydrogen peroxide-ferrous chloride, and sodium persulfate-sodium hydrogen sulfite.

In the step I according to the method for producing the second monolith, there is no limitation on the mixing method upon mixing an oil soluble monomer without ion exchange groups, a surfactant, water, and a polymerization initiator to form a water in oil type emulsion. For example, a method in which all components are mixed at once, or a method in which oil soluble components, including an oil soluble monomer, a surfactant, and an oil soluble polymerization initiator, and water soluble components, including water and a water soluble polymerization initiator, are separately dissolved to be uniform, and then these components are mixed together can be used. There is no particular limitation on the mixing apparatus for forming an emulsion, either. For example, an ordinary mixer, homogenizer, or high pressure homogenizer can be used, and an appropriate apparatus may be selected to obtain the target emulsion particle diameter. Also, there is no particular limitation on the mixing conditions, and the stirring speed and stirring time at which the target emulsion particle diameter can be obtained can be arbitrarily set.

The monolithic intermediate (2) obtained in the step I according to the method for producing the second monolith is an organic polymer material having a crosslinked structure, and is suitably an aromatic vinyl polymer. Although the crosslinking density of that polymer material is not particularly limited, it is preferable to include 0.1 to 5 mol %, preferably 0.3 to 3 mol % of crosslinked structural units with respect to the entire constituent units that constitute the polymer material. When the crosslinked structural units are less than 0.3 mol %, it is not preferable because the mechanical strength is insufficient. On the other hand, when they are greater than 5 mol %, it is not preferable because the structure of the monolith easily deviates from the co-continuous structure. In particular, when the total pore volume is 16 to 20 ml/g, it is preferable that the crosslinked structural units should be less than 3 mol % in order to form a co-continuous structure.

In the step I according to the method for producing the second monolith, examples of the type of polymer material of the monolithic intermediate (2) include those that are the same as the polymer material of the first monolith.

Figure 12:
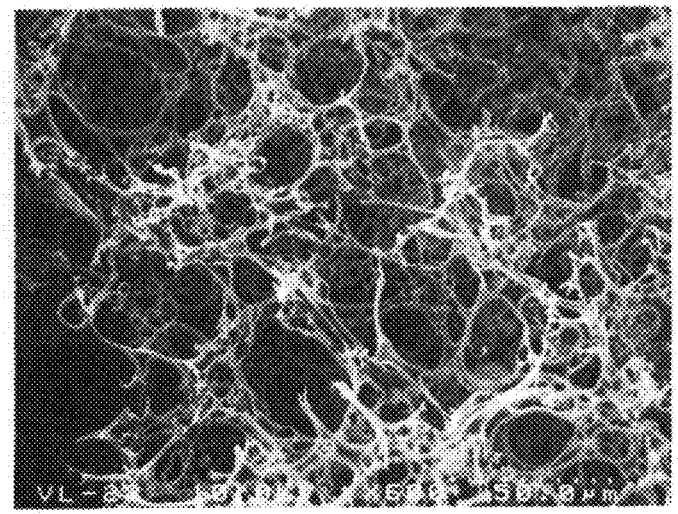
FIG. 12 is a SEM photograph of an exemplary embodiment of a monolithic intermediate (2).

The total pore volume per weight of the monolithic intermediate (2) in a dry state, obtained in the step I according to the method for producing the second monolith, is greater than 16 mL/g and not more than 30 mL/g, and suitably greater than 16 mL/g and not more than 25 mL/g. That is, although this monolithic intermediate (2) basically has a continuous macropore structure, its apertures (mesopores), which are the overlapping portions of macropores with each other, are significantly large, and therefore the framework constituting the monolithic structure has a structure that is very close to a two dimensional wall surface to a one dimensional rod-like framework. FIG. 12 shows a SEM photograph of an exemplary embodiment of the monolithic intermediate (2), which has a near rod-like framework. When this is allowed to coexist in the polymerization system, a porous material with a co-continuous structure is formed using the structure of the monolithic intermediate (2) as a mold. When the total pore volume is too small, it is not preferable because the structure of the monolith obtained after the polymerization of the vinyl monomer changes from a co-continuous structure to a continuous macropore structure. On the other hand, when the total pore volume is too large, it is not preferable because the mechanical strength of the monolith obtained after the polymerization of the vinyl monomer is reduced, or when anion exchange groups are introduced, the anion exchange capacity per volume is reduced. To make the total pore volume of the monolithic intermediate (2) within the range described above, the ratio of monomer to water should be generally 1:20 to 1:40.

In addition, for the monolithic intermediate (2) obtained in the step I according to the method for producing the second monolith, the average diameter of apertures (mesopores), which are the overlapping portions of macropores with each other, in a dry state is 5 to 100 μm. When the average diameter of apertures in a dry state is less than 5 μm, it is not preferable because the aperture diameter of the monolith obtained after the polymerization of the vinyl monomer is small and the pressure loss upon fluid permeation is large. On the other hand, when it is greater than 100 μm, it is not preferable because the aperture diameter of the monolith obtained after the polymerization of the vinyl monomer is too large and the contact between the liquid to be treated and the monolithic anion exchanger is insufficient, resulting in a reduction in the removal performance. It is suitable for the monolithic intermediate (2) to have a uniform structure in which the sizes of the macropores and the diameters of the apertures are uniform, but it is not limited to this, and may be dotted with nonuniform macropores that are larger than the size of the uniform macropores in the uniform structure.

The step II according to the method for producing the second monolith is a step of preparing a mixture formed of an aromatic vinyl monomer, a crosslinking agent at 0.3 to 5 mol % among the entire oil soluble monomers having at least two or more vinyl groups in one molecule, an organic solvent that dissolves the aromatic vinyl monomer and the crosslinking agent, but does not dissolve a polymer produced by polymerization of the aromatic vinyl monomer, and a polymerization initiator. Note that there is no order for the step I and the step II, and the step II may be performed after the step I or the step I may be performed after the step II.

As for the aromatic vinyl monomer used in the step II according to the method for producing the second monolith, there is no particular limitation as long as it contains a polymerizable vinyl group in the molecule and is lipophilic aromatic vinyl monomer with high solubility in an organic solvent. However, it is preferable to select a vinyl monomer that produces a polymer material of the same type as or similar to the monolithic intermediate (2) coexisting in the polymerization system described above. Specific examples of such a vinyl monomer include styrene, α-methylstyrene, vinyl toluene, vinylbenzyl chloride, vinyl biphenyl, and vinyl naphthalene. These monomers may be used alone as one kind, or may be used in combination of two or more kinds. An aromatic vinyl monomer that is suitably used is styrene, vinylbenzyl chloride, or the like.

The amount to be added of the aromatic vinyl monomer used in the step II according to the method for producing the second monolith is 5 to 50 times, preferably 5 to 40 times by weight, with respect to the monolithic intermediate (2) coexisting at the time of polymerization. When the amount of the aromatic vinyl monomer to be added is less than 5 times that of the monolithic intermediate (2), it is not preferable because the rod-like framework cannot be made thicker and the anion exchange capacity per volume after the introduction of anion exchange groups is small when the anion exchange groups are introduced. On the other hand, when the amount of the aromatic vinyl monomer to be added is greater than 50 times, it is not preferable because the diameter of the continuous pores is small and the pressure loss upon passing the liquid is large.

As the crosslinking agent used in the step II according to the method for producing the second monolith, those containing at least two polymerizable vinyl groups in the molecule and having a high solubility in an organic solvent are suitably used. Specific examples of the crosslinking agent include divinylbenzene, divinyl naphthalene, divinyl biphenyl, ethylene glycol dimethacrylate, trimethylolpropane triacrylate, and butanediol diacrylate. These crosslinking agents may be used alone as one kind, or may be used in combination of two or more kinds. A preferable crosslinking agent is an aromatic polyvinyl compound such as divinylbenzene, divinyl naphthalene, and divinyl biphenyl because of its high mechanical strength and stability against hydrolysis. The amount of the crosslinking agent to be used is 0.3 to 5 mol %, in particular 0.3 to 3 mol %, of the total amount of the vinyl monomer and crosslinking agent (the entire oil soluble monomers). When the amount of the crosslinking agent to be used is less than 0.3 mol %, it is not preferable because the mechanical strength of the monolith is insufficient. On the other hand, when it is too large, it is not preferable because quantitative introduction of anion exchange groups may be difficult when the anion exchange groups are introduced. Note that it is preferable to use the crosslinking agent described above in an amount to be used such that the crosslinking density of the vinyl monomer and the crosslinking agent is approximately equal to that of the monolithic intermediate (2) coexisting upon the polymerization of the vinyl monomer/crosslinking agent. When both are used in amounts that are too far apart, a deviation in the crosslinking density distribution occurs in the produced monolith, and when anion exchange groups are introduced, cracks are likely to be generated upon the introduction reaction of the anion exchange groups.

The organic solvent used in the step II according to the method for producing the second monolith is an organic solvent that dissolves the aromatic vinyl monomer and the crosslinking agent, but does not dissolve a polymer produced by polymerization of the aromatic vinyl monomer. In other words, it is a poor solvent for a polymer produced by polymerization of the aromatic vinyl monomer. Since the organic solvent greatly varies depending on the type of the aromatic vinyl monomer, it is difficult to specifically recite general examples, but for example, when the aromatic vinyl monomer is styrene, examples of the organic solvent include an alcohol such as methanol, ethanol, propanol, butanol, hexanol, cyclohexanol, octanol, 2-ethylhexanol, decanol, dodecanol, propylene glycol, and tetramethylene glycol; a chain (poly)ether such as diethyl ether, butyl cellosolve, polyethylene glycol, polypropylene glycol, and polytetramethylene glycol; a chain saturated hydrocarbon such as hexane, heptane, octane, isooctane, decane, and dodecane; an ester such as ethyl acetate, isopropyl acetate, cellosolve acetate, and ethyl propionate. Also, even a good solvent for polystyrene, such as dioxane, THF, or toluene, can be used as the organic solvent when it is used together with the poor solvents described above and the amount thereof to be used is small. It is preferable to use these organic solvents in an amount to be used such that the concentration of the above aromatic vinyl monomer is 30 to 80% by weight. When the amount of the organic solvent to be used departs from the range described above and the concentration of the aromatic vinyl monomer is less than 30% by weight, it is not preferable because the polymerization rate is reduced or the monolithic structure after polymerization departs from the range of the second monolith. On the other hand, when the concentration of the aromatic vinyl monomer is greater than 80% by weight, it is not preferable because the polymerization may run out of control.

As the polymerization initiator used in the step II according to the method for producing the second monolith, a compound that generates radicals by heat or light irradiation is suitably used. It is preferable that the polymerization initiator should be oil soluble. Specific examples of the polymerization initiator include 2,2'-azobis(isobutyronitrile), 2,2'-azobis(2,4-dimethylvaleronitrile), 2,2'-azobis(2-methylbutyronitrile), 2,2'-azobis(4-methoxy-2,4-dimethylvaleronitrile), dimethyl 2,2'-azobis(isobutyrate), 4,4'-azobis(4-cyanovaleric acid), 1,1'-azobis(cyclohexane-1-carbonitrile), benzoyl peroxide, lauroyl peroxide, potassium persulfate, ammonium persulfate, and tetramethylthiuram disulfide. Although the amount of the polymerization initiator to be used varies greatly depending on the type of monomer, polymerization temperature, and the like, it can be used in a range of about 0.01 to 5% with respect to the total amount of the vinyl monomer and the crosslinking agent.

The step III according to the method for producing the second monolith is a step of polymerizing the mixture obtained in the step II while leaving it to stand still and in the presence of the monolithic intermediate (2) obtained in the step I, thereby changing the continuous macropore structure of the monolithic intermediate (2) to a co-continuous structure, obtaining a second monolith, which is a monolith with a co-continuous structure. The monolithic intermediate (2) used in the step III plays an extremely important role in creating a monolith with the structure of the present invention. As disclosed in Japanese Translation of PCT International Application Publication No. 1995-501140 and the like, static polymerization of the vinyl monomer and the crosslinking agent in a certain organic solvent in the absence of the monolithic intermediate (2) yields a particle aggregated type monolithic organic porous material. In contrast, when a monolithic intermediate (2) with a particular continuous macropore structure is present in the above polymerization system, as in the case of producing the second monolith, the structure of the monolith after polymerization is changed dramatically, the particle aggregated structure disappears, and the second monolith with the co-continuous structure mentioned above is obtained. Although the reason for this has not been elucidated in detail, it is thought that, when the monolithic intermediate (2) is not present, the particle aggregated structure is formed by the precipitation and sedimentation of the crosslinked polymer produced by the polymerization in a particle form, whereas when a porous material (intermediate) with a large total pore volume is present in the polymerization system, the vinyl monomer and the crosslinking agent are adsorbed or distributed from the liquid phase to the framework part of the porous material, polymerization proceeds in the porous material, and the framework constituting the monolithic structure is changed from a two dimensional wall surface to a one dimensional rod-like framework, thereby forming a second monolith having a co-continuous structure.

In the method for producing the second monolith, there is no particular limitation on the inner volume of the reaction vessel as long as it is large enough to allow the monolithic intermediate (2) to exist in the reaction vessel, and when the monolithic intermediate (2) is placed in the reaction vessel, a gap may be created around the monolith in a plane view or the monolithic intermediate (2) may be placed in the reaction vessel with no gap, either of which is fine. Among the above, a case is efficient in which a monolith with a thick framework after polymerization is placed in the reaction vessel with no gap without receiving pressure from the inner wall of the vessel, which does not cause distortion of the monolith and does not waste reaction raw materials and the like. Note that, even when the inner volume of the reaction vessel is large and there are gaps around the monolith after polymerization, the vinyl monomer and the crosslinking agent are adsorbed and distributed to the monolithic intermediate (2), and therefore, no particle aggregated structure is produced in the part of gaps in the reaction vessel.

In the step III according to the method for producing the second monolith, the monolithic intermediate (2) is placed in the reaction vessel in a state of being impregnated with the mixture (solution). As for the compounding ratio between the mixture obtained in the step II and the monolithic intermediate (2), it is suitable that they should be compounded such that the amount of the vinyl monomer to be added is 3 to 50 times, preferably 4 to 40 times by weight with respect to the monolithic intermediate (2), as mentioned above. By doing so, a second monolith with a thick framework while having a moderate aperture diameter can be obtained. In the reaction vessel, the vinyl monomer and crosslinking agent in the mixture are adsorbed and distributed to the framework of the monolithic intermediate that is left to stand still, and polymerization proceeds in the framework of the monolithic intermediate (2).

In the step III according to the method for producing the second monolith, the monolithic intermediate (2) is placed in the reaction vessel in a state of being impregnated with the mixture (solution). As for the compounding ratio between the mixture obtained in the step II and the monolithic intermediate (2), it is suitable that they should be compounded such that the amount of the aromatic vinyl monomer to be added is 5 to 50 times, preferably 5 to 40 times by weight with respect to the monolithic intermediate (2), as mentioned above. By doing so, a second monolith with a co-continuous structure in which moderately sized pores are three dimensionally continuous and the thick framework is also three dimensionally continuous can be obtained. In the reaction vessel, the aromatic vinyl monomer and crosslinking agent in the mixture are adsorbed and distributed to the framework of the monolithic intermediate (2) that is left to stand still, and polymerization proceeds in the framework of the monolithic intermediate (2).

As for the polymerization conditions in the step III according to the method for producing the second monolith, a variety of conditions are selected depending on the type of monomer and the type of initiator. For example, when 2,2'-azobis(isobutyronitrile), 2,2'-azobis(2,4-dimethylvaleronitrile), benzoyl peroxide, lauroyl peroxide, potassium persulfate, or the like is used as the initiator, heat polymerization may be performed at 30 to 100° C. for 1 to 48 hours in a sealed container under an inert atmosphere. By the heat polymerization, the vinyl monomer and crosslinking agent that have been adsorbed and distributed to the framework of the monolithic intermediate (2) are polymerized in the framework, making the framework thicker. After the completion of polymerization, the contents are taken out and extracted with a solvent such as acetone for the purpose of removing the unreacted vinyl monomer and the organic solvent, thereby obtaining the second monolith.

The second monolithic anion exchanger is obtained by performing a step IV to introduce anion exchange groups into the second monolith obtained in the step III.

The method for introducing anion exchange groups into the second monolith is the same as the method for introducing anion exchange groups into the first monolith.

The second monolith and the second monolithic anion exchanger have high mechanical strength due to their thick framework even though the size of the three dimensionally continuous pores is significantly large. In addition, since the second monolithic anion exchanger has a thick framework, the cation exchange capacity per volume in a water wet state can be increased, and furthermore, the liquid to be treated can be kept flowing at a low pressure and high flow rate for a long period of time.

Also, the monolithic cation exchanger differs from the monolithic anion exchanger in that the ion exchange groups introduced into the monolith are cation exchange groups rather than anion exchange groups, but is otherwise similar. Therefore, for the monolithic cation exchanger, anion should be read as cation in the above description for the monolithic cation exchanger. In the following, for the monolithic cation exchanger, some points that are different from the monolithic anion exchanger will be explained.

Examples of the cation exchange groups introduced into the monolithic cation exchanger include a sulfonic acid group, a carboxyl group, an iminodiacetic acid group, a phosphoric acid group, and a phosphate ester group. In addition, examples of the cation exchange groups introduced into the first monolithic cation exchanger include a carboxylic acid group, an iminodiacetic acid group, a sulfonic acid group, a phosphoric acid group, and a phosphate ester group. The cation exchange groups introduced into the first monolithic cation exchanger are the same in the second monolithic cation exchanger.

In addition, as for the method for introducing cation exchange groups, for example, the method for introducing sulfonic acid groups into the monolith, examples thereof include: a method in which, when the monolith is a styrene-divinylbenzene copolymer or the like, chlorosulfuric acid, concentrated sulfuric acid, or fuming sulfuric acid is used for sulfonation; a method in which radical initiation groups or chain transfer groups are uniformly introduced into the monolith on the framework surface and inside the framework, and sodium styrenesulfonate or acrylamido-2-methylpropanesulfonic acid is graft polymerized; and a method in which glycidyl methacrylate is graft polymerized in the same manner, and then sulfonic acid groups are introduced by functional group transformation. Among these methods, the method in which chlorosulfuric acid is used to introduce sulfonic acid into a styrene-divinylbenzene copolymer is preferable in that cation exchange groups can be introduced uniformly and quantitatively. Note that examples of the cation exchange groups to be introduced include a cation exchange group such as a carboxylic acid group, an iminodiacetic acid group, a sulfonic acid group, a phosphoric acid group, and a phosphate ester group.

When the ion exchanger-filled module is filled with a particulate cation exchange resin, examples of the matrix structure of cation exchange resin in the particulate cation exchange resin include, for example, a styrene-based, phenol-based, acrylic-based, and methacrylic-based structure. The cation exchange resin may have any structure among a gel type structure, macroporous structure, and porous structure. Examples of the cation exchange groups in the cation exchange resin include sulfonic acid groups, sulfonic acid groups, carboxylic acid groups, and phosphoric acid groups, and examples of the functional groups having a chelating function include, for example, iminodiacetic acid groups, mercapto groups, and ethylenediamine. Examples of the particulate cation exchange resin include, for example, AMBERJET 1020 available from The Dow Chemical Company, C110 available from Purolite Corporation, S930/4922 available from Purolite Corporation, and SA10A available from Mitsubishi Chemical Corporation.

As a result of diligent researches by the present inventors, it was found that the monolithic organic porous anion exchanger exerts excellent removal performance in adsorbing and removing B, As, Al, Ti, Cr, Fe, Cu, Zn, Sn, V, Ga, and Pb, and particularly in adsorbing and removing B and As in ultrapure water.

And, in the method for producing ultrapure water of the present invention, by installing the ion exchanger-filled module filled with at least the monolithic organic porous anion exchanger at an arbitrary location between the supply point for raw material water for ultrapure water production containing metal impurities of any one or two or more elements selected from B, As, Al, Ti, Cr, Fe, Cu, Zn, Sn, V, Ga, and Pb and the use point, and by treating water to be treated that flows therethrough, ultrapure water in which these impurities have been removed to an appropriate degree as ultrapure water to be used in the washing step of the semiconductor production process can be produced from the raw material for ultrapure water production containing the above impurities.

As a result of diligent researches by the present inventors, it was found that the monolithic organic porous anion exchanger can adsorb and remove, in addition to ionic impurities of the elements: B, As, Al, Ti, Cr, Fe, Cu, Zn, Sn, V, Ga, and Pb in the ultrapure water, fine particles containing the following elements: B, As, Al, Ti, Cr, Fe, Cu, Zn, Sn, V, Ga, Pb, Li, Na, Mg, K, Ca, Mn, Co, Ni, Cd, Ba, and the like, well.

And, in the method for producing ultrapure water of the present invention, by installing the ion exchanger-filled module filled with at least the monolithic organic porous anion exchanger at an arbitrary location between the supply point for raw material water for ultrapure water production containing, as metal impurities, in addition to ionic impurities of the elements: B, As, Al, Ti, Cr, Fe, Cu, Zn, Sn, V, Ga, and Pb, fine particles containing the following elements: B, As, Al, Ti, Cr, Fe, Cu, Zn, Sn, V, Ga, Pb, Li, Na, Mg, K, Ca, Mn, Co, Ni, Cd, Ba, and the like, and the use point, and by treating water to be treated that flows therethrough, ultrapure water in which these impurities, that is, metal impurities of any one or two or more elements selected from B, As, Al, Ti, Cr, Fe, Cu, Zn, Sn, V, Ga, and Pb, have been removed to an appropriate degree as ultrapure water to be used in the washing step of the semiconductor production process can be produced from the raw material for ultrapure water production containing the above impurities.

An ultrapure water production system of the present invention is an ultrapure water production system for carrying out the above method for producing ultrapure water of the present invention, wherein the system has an ion exchanger-filled module filled with a monolithic organic porous anion exchanger in a treatment path of an ultrapure water production apparatus or in a transfer path from an ultrapure water production apparatus to a use point.

The ultrapure water production apparatus, the monolithic organic porous anion exchanger, and the ion exchanger-filled module according to the ultrapure water production system of the present invention are the same as the ultrapure water production apparatus, the monolithic organic porous anion exchanger, and the ion exchanger-filled module according to the method for producing ultrapure water of the present invention.

An ion exchanger-filled module of the present invention is an ion exchanger-filled module, wherein the module is filled with at least a monolithic organic porous anion exchanger, and wherein the module is installed in a treatment path of an ultrapure water production apparatus of an ultrapure water production system for supplying, to a use point, ultrapure water obtained by treating raw material water for ultrapure water production in the ultrapure water production apparatus, or in a transfer path from the ultrapure water production apparatus to the use point.

The ion exchanger-filled module of the present invention is the module used in the method for producing ultrapure water of the present invention and the ultrapure water production system of the present invention.

That is, the ion exchanger-filled module of the present invention is a module wherein the module is installed in a treatment path of an ultrapure water production apparatus of an ultrapure water production system for supplying, to a use point, ultrapure water obtained by treating raw material water for ultrapure water production is treated in the ultrapure water production apparatus, or in a transfer path from the ultrapure water production apparatus to the use point.

The ion exchanger-filled module of the present invention is the same as the ion exchanger-filled module according to the method for producing ultrapure water of the present invention.

Examples of the ion exchanger-filled module of the present invention include, for example, those having an ion exchanger filling cartridge filled with at least the monolithic organic porous anion exchanger, and a housing in which the ion exchanger filling cartridge is installed inside.

In the ion exchanger-filled module of the present invention (in the case of an ion exchanger-filled module formed of an ion exchanger filling cartridge in which an ion exchanger is filled in a filling container and a housing into which the ion exchanger filling cartridge is installed, the ion exchanger filling cartridge), a cation exchanger may be filled in a stage preceding the monolithic organic porous anion exchanger. Examples of the ion exchanger-filled module into which a cation exchanger is filled in a stage preceding the monolithic organic porous anion exchanger include those in which a cation exchanger, the monolithic organic porous anion exchanger, a cation exchanger, and the monolithic organic porous anion exchanger are laminated and filled in this order from the side where water to be treated is supplied. In the ion exchanger-filled module of the present invention (in the case of an ion exchanger-filled module formed of an ion exchanger filling cartridge in which an ion exchanger is filled in a filling container and a housing into which the ion exchanger filling cartridge is installed, the ion exchanger filling cartridge), a monolithic organic porous cation exchanger may be filled in a stage subsequent to the monolithic organic porous anion exchanger. Examples of the ion exchanger-filled module into which a cation exchanger is filled in a stage subsequent to the monolithic organic porous anion exchanger include those in which the monolithic organic porous anion exchanger, a monolithic organic porous cation exchanger, the monolithic organic porous anion exchanger, and a monolithic organic porous cation exchanger are laminated and filled in this order from the side where water to be treated is supplied.

Next, Examples will be given to illustrate the present invention in detail, but these are merely examples and do not limit the present invention.

EXAMPLES

The second monolithic cation exchanger was produced by the same method as Reference Example 17 of Examples in the specification according to Japanese Patent Laid-Open No. 2010-234357.

Reference Example 1

<Production of Second Monolithic Anion Exchanger and Second Monolithic Cation Exchanger>
(Step I; Production of Monolithic Intermediate)

5.4 g of styrene, 0.17 g of divinylbenzene, 1.4 g of sorbitan monooleate (hereinafter, abbreviated as SMO), and 0.26 g of 2,2'-azobis(isobutyronitrile) were mixed and uniformly dissolved. Next, the styrene/divinylbenzene/SMO/2,2'-azobis(isobutyronitrile) mixture was added to 180 g of pure water and stirred under reduced pressure in the temperature range of 5 to 20° C. using Vacuum Mixing & Degassing Mixer (available from EME CORPORATION), which is a planetary stirring apparatus, to obtain a water in oil type emulsion. This emulsion was immediately transferred to a reaction vessel and allowed to be polymerized under static conditions at 60° C. for 24 hours after sealing. After the completion of polymerization, the contents were taken out, extracted with methanol, and then dried under reduced pressure to produce a monolithic intermediate having a continuous macropore structure. The internal structure of the monolithic intermediate (dried material) thus obtained was observed with SEM images, and it was found that the wall part dividing two adjacent macropores was very thin and rod-like, but had a continuous bubble structure, and the apertures (mesopores), which were the overlapping portions of macropores with each other, had an average diameter of 70 μm and a total pore volume of 21.0 ml/g, as measured by the mercury injection method.

(Production of Monolith with Co-Continuous Structure)

Then, 76.0 g of styrene, 4.0 g of divinylbenzene, 120 g of 1-decanol, and 0.8 g of 2,2'-azobis(2,4-dimethylvaleronitrile) were mixed and uniformly dissolved (step II). Next, by cutting the above monolithic intermediate into a disc with a diameter of 70 mm and a thickness of about 40 mm, 4.1 g was separated. The separated monolithic intermediate was placed in a reaction vessel with an inner diameter of 110 mm and immersed in the styrene/divinylbenzene/1-decanol/2,2'-azobisis(2,4-dimethylvaleronitrile) mixture. After defoaming in a reduced pressure chamber, the reaction vessel was sealed and the mixture was polymerized under static conditions at 60° C. for 24 hours. After the completion of polymerization, the monolithic content with a thickness of about 60 mm was taken out, soxhlet extracted with acetone, and then dried at 85° C. under reduced pressure overnight (step III).

The internal structure of the monolith (dried material) thus obtained, containing 3.2 mol % of crosslinked components formed of the styrene/divinylbenzene copolymer, was observed with SEM, and it was found that the monolith had a co-continuous structure in which the framework and pores were three dimensionally continuous and both phases were intertwined. In addition, the thickness of the framework measured from SEM images was 17 μm. Also, the size of the three dimensionally continuous pores in the monolith was 41 μm and the total pore volume was 2.9 ml/g, as measured by the mercury injection method.

(Production of Monolithic Anion Exchanger with Co-Continuous Structure)

The monolith produced by the method described above was cut into a disc with a diameter of 70 mm and a thickness of about 50 mm. To this, 4700 ml of dimethoxymethane and 67 ml of tin tetrachloride were added, and 1870 ml of chlorosulfuric acid was added dropwise under ice cooling. After the completion of dropwise addition, the temperature was raised and the reaction was allowed at 35° C. for 5 hours, introducing chloromethyl groups. After the completion of reaction, the mother liquor was drained out with a siphon, and the monolith was washed with a mixed solvent of THF/water=2/1 and further washed with THF. To this chloromethylated monolithic organic porous material, 3400 ml of THF and 2000 ml of a 30% aqueous solution of trimethylamine were added and the mixture was allowed to react at 60° C. for 6 hours. After the completion of reaction, the product was washed with a mixed solvent of methanol/water and then washed with pure water to isolate it. As such, a monolithic anion exchanger A having a co-continuous structure was obtained.

(Production of Monolithic Cation Exchanger with Co-Continuous Structure)

The monolith produced by the method described above was cut into a disc with a diameter of 75 mm and a thickness of about 15 mm. To this, 1500 ml of dichloromethane was added, the mixture was heated at 35° C. for 1 hour and then cooled to 10° C. or lower, 99 g of chlorosulfuric acid was gradually added, and the temperature was raised and the reaction was allowed at 35° C. for 24 hours. Subsequently, methanol was added and the remaining chlorosulfuric acid was quenched, the mixture was washed with methanol to remove dichloromethane, and further washed with pure water to obtain a monolithic cation exchanger B having a co-continuous structure.

(Analysis for Monolithic Anion Exchanger A)

The obtained monolithic anion exchanger A was partially cut out and dried, and then its internal structure was observed by SEM, and it was confirmed that the monolithic anion exchanger maintained its co-continuous structure. Also, the swelling rate of the monolithic anion exchanger A before and after the reaction was 1.4 times, and the anion exchange capacity per volume in a water wet state was 0.72 mg equivalent/ml. When the size of the continuous pores of the monolith in a water wet state was estimated based on the value of the monolith and the swelling rate of the cation exchanger in a water wet state, it was 70 μm, and the diameter of the framework was 23 μm and the total pore volume was 2.9 ml/g.

In addition, the differential pressure coefficient, which is an index of the pressure loss when water is allowed to permeate through, was 0.005 MPa/m·LV. Furthermore, the length of the ion exchange zone for chloride ions in the monolithic anion exchanger A was measured, and the length of the ion exchange zone at LV=20 m/h was 16 mm.

Next, in order to confirm the distribution state of quaternary ammonium groups in the monolithic anion exchanger A, the anion exchanger A was treated with an aqueous hydrochloric acid solution to make them into the chloride form, and then the distribution state of chlorine atoms was observed by EPMA. As a result, it was observed that the quaternary ammonium groups were uniformly introduced into the framework surface and inside the framework (in the cross sectional direction) of the anion exchanger.

(Analysis for Monolithic Cation Exchanger)

Also, the obtained monolithic cation exchanger B was partially cut out and dried, and then its internal structure was observed by SEM, and it was confirmed that the monolithic cation exchanger maintained its co-continuous structure. In addition, the swelling rate of the monolithic cation exchanger B before and after the reaction was 1.4 times, and the cation exchange capacity per volume in a water wet state was 0.72 mg equivalent/ml. When the size of the continuous pores of the monolith in a water wet state was estimated based on the value of the monolith and the swelling rate of the cation exchanger in a water wet state, it was 70 μm, and the diameter of the framework was 23 μm and the total pore volume was 2.9 ml/g.

In addition, the differential pressure coefficient, which is an index of the pressure loss when water is allowed to permeate through, was 0.005 MPa/m·LV. Furthermore, the length of the ion exchange zone for sodium ions in the monolithic cation exchanger B was measured, and the length of the ion exchange zone at LV=20 m/h was 16 mm, which was not only overwhelmingly shorter than the value (320 mm) of a commercially available strong acidic cation exchange resin, Amberlite IR120B (available from The Dow Chemical Company), but also shorter than the values of conventional monolithic porous cation exchangers having a continuous bubble structure.

Next, in order to confirm the distribution state of sulfonic acid groups in the monolithic cation exchanger B, the distribution state of sulfur atoms was observed by EPMA. As a result, it was observed that the sulfonic acid groups were uniformly introduced into the framework surface and inside the framework (in the cross sectional direction) of the cation exchanger.

Example 1

The monolithic anion exchanger A was cut into the shape shown in Table 1 and was filled into a PFA (tetrafluoroethylene-perfluoroalkyl vinyl ether copolymer) column of φ 10 mm by φ 12 mm to fabricate an ion exchanger filling cartridge.

Then, a test water 1, which will be mentioned later, was supplied and treated under the water passing conditions shown in Table 1. The results of analysis for each element in the treated water are shown in Table 2.

Comparative Example 1

The monolithic cation exchanger B was cut into the shape shown in Table 1 and was filled into a PFA (tetrafluoroethylene-perfluoroalkyl vinyl ether copolymer) column of φ 10 mm by φ 12 mm to fabricate an ion exchanger filling cartridge.

Then, the test water 1 was supplied and treated under the water passing conditions shown in Table 1. The results of analysis for each element in the treated water are shown in Table 2.

Example 2

Both the monolithic anion exchanger A and the monolithic cation exchanger B were cut into the shape shown in Table 1, and a PFA (tetrafluoroethylene-perfluoroalkyl vinyl ether copolymer) column of φ 10 mm by φ 12 mm was filled with the monolithic cation exchanger B in the foregoing stage and the monolithic anion exchanger A in the subsequent stage to fabricate an ion exchanger filling cartridge.

Then, the test water 1 was supplied and treated under the water passing conditions shown in Table 1. The results of analysis for each element in the treated water are shown in Table 2.

Example 3

Both the monolithic anion exchanger A and the monolithic cation exchanger B were cut into the shape shown in Table 1, and a PFA (tetrafluoroethylene-perfluoroalkyl vinyl ether copolymer) column of φ 10 mm by φ 12 mm was filled with the monolithic anion exchanger A in the foregoing stage and the monolithic cation exchanger B in the subsequent stage to fabricate an ion exchanger filling cartridge.

Then, the test water 1 was supplied and treated under the water passing conditions shown in Table 1. The results of analysis for each element in the treated water are shown in Table 2.

Comparative Example 2

A particulate anion exchange resin (available from The Dow Chemical Company, AMBERJET ESG 4002 (OH), average particle diameter: 0.5 to 0.65 mm, ion exchange capacity in wet state: ≥1.25 mg equivalent/g, anion exchange group: quaternary ammonium) was filled into the filling container to form a filling layer with the shape shown in Table 1, thereby fabricating an ion exchanger filling cartridge.

Then, the test water 1 was supplied and treated under the water passing conditions shown in Table 1. The results of analysis for each element in the treated water are shown in Table 2.

Comparative Example 3

A particulate cation exchange resin (available from The Dow Chemical Company, model number: AMBERJET 1024 (H), average particle diameter: 0.60 to 0.70 mm, ion exchange capacity in wet state: ≥2.1 mg equivalent/g, cation exchange group: sulfonic acid group) was filled into a PFA (tetrafluoroethylene-perfluoroalkyl vinyl ether copolymer) column with an inner diameter of φ 10 mm by φ 12 mm such that a filling layer with the shape shown in Table 1 was formed, thereby fabricating an ion exchanger filling cartridge.

Then, the test water 1 was supplied and treated under the water passing conditions shown in Table 1. The results of analysis for each element in the treated water are shown in Table 2.

Comparative Example 4

The particulate anion exchange resin used in Comparative Example 2 and the particulate cation exchange resin used in Comparative Example 3 were mixed in a volume ratio of 1:1, and the mixture was filled into a PFA (tetrafluoroethylene-perfluoroalkyl vinyl ether copolymer) column of φ 10 mm by φ 12 mm such that a filling layer with the shape shown in Table 1 was formed, thereby fabricating an ion exchanger filling cartridge.

Then, the test water 1 was supplied and treated under the water passing conditions shown in Table 1. The results of analysis for each element in the treated water are shown in Table 2.

(Test Water 1)

As the test water 1, a test water A adjusted to contain each of Li, B, Na, Mg, Al, K, Ca, Ti, V, Cr, Mn, Fe, Co, Ni, Cu, Zn, Ga, As, Cd, Sn, Ba, and Pb at 2000 ng/L, and a test water B adjusted to contain each of them at 20 ng/L were prepared.

(Analysis)

The content of each element in the test water and the treated water was measured by ICP-MS to determine the removal rate.

TABLE 1

| Ion exchanger Type | | Example 1 | Comparative Example 1 | Example 2 | Example 3 | Comparative Example 2 | Comparative Example 3 | Comparative Example 4 |
|---|---|---|---|---|---|---|---|---|
| | | Monolith | | | | Ion exchange resin | | |
| | | Anion | Cation | Cation foregoing stage Anion subsequent stage | Anion foregoing stage Cation subsequent stage | Anion | Cation | Anion + Cation |
| φ | mm | 10 | 10 | 10 | 10 | 10 | 10 | 10 |
| Layer height | mm | 20 | 20 | 40 | 40 | 20 | 20 | 40 |
| Volume | ml | 1.6 | 1.6 | 3.1 | 3.1 | 1.6 | 1.6 | 3.1 |
| Water passing flow rate | L/h | 2 | 2 | 2 | 2 | 2 | 2 | 2 |
| SV | h$^{-1}$ | 1274 | 1274 | 637 | 637 | 1274 | 1274 | 637 |
| LV | m/h | 25 | 25 | 25 | 25 | 25 | 25 | 25 |

TABLE 2

| | | Li | B | Na | Mg | Al | K | Ca | Ti | V | Cr | Mn |
|---|---|---|---|---|---|---|---|---|---|---|---|---|
| 2000 ng/L | Example 1 | 29% | >99% | 10% | 16% | >99% | 21% | 6% | >99% | >99% | >99% | 15% |
| | Comparative Example 1 | >99% | 29% | >99% | >99% | >99% | >99% | >99% | >99% | >99% | >99% | >99% |
| | Example 2 | >99% | >99% | >99% | >99% | >99% | >99% | >99% | >99% | >99% | >99% | >99% |
| | Example 3 | >99% | >99% | >99% | >99% | >99% | >99% | >99% | >99% | >99% | >99% | >99% |
| | Comparative Example 2 | 12% | 81% | 10% | 14% | 33% | 13% | 10% | 44% | 63% | 19% | 15% |
| | Comparative Example 3 | 68% | 0% | 68% | 68% | 62% | 65% | 63% | 48% | 44% | 63% | 68% |
| | Comparative Example 4 | 53% | 80% | 36% | 25% | 31% | 30% | 22% | 40% | 60% | 20% | 17% |

| | | Fe | Co | Ni | Cu | Zn | Ga | As | Cd | Sn | Ba | Pb |
|---|---|---|---|---|---|---|---|---|---|---|---|---|
| 2000 ng/L | Example 1 | >99% | 19% | 24% | >99% | >99% | >99% | >99% | 34% | >99% | 18% | >99% |
| | Comparative Example 1 | >99% | >99% | >99% | >99% | >99% | >99% | 10% | 91% | >99% | >99% | >99% |
| | Example 2 | >99% | >99% | >99% | >99% | >99% | >99% | >99% | >99% | >99% | >99% | >99% |
| | Example 3 | >99% | >99% | >99% | >99% | >99% | >99% | >99% | >99% | >99% | >99% | >99% |
| | Comparative Example 2 | 32% | 15% | 2% | 18% | 18% | 50% | 80% | 17% | 65% | 4% | 7% |
| | Comparative Example 3 | 65% | 71% | 51% | 71% | 47% | 61% | 0% | 39% | 50% | 58% | 71% |
| | Comparative Example 4 | 16% | 32% | 32% | 35% | 43% | 33% | 63% | 30% | 64% | 50% | 25% |

| | | Li | B | Na | Mg | Al | K | Ca | Ti | V | Cr | Mn |
|---|---|---|---|---|---|---|---|---|---|---|---|---|
| 20 ng/L | Example 1 | 27% | >99% | 10% | 22% | >99% | 28% | 14% | >99% | >99% | >99% | 27% |
| | Comparative Example 1 | >99% | 25% | >99% | >99% | >99% | >99% | >99% | >99% | >99% | >99% | >99% |
| | Example 2 | >99% | >99% | >99% | >99% | >99% | >99% | >99% | >99% | >99% | >99% | >99% |
| | Example 3 | >99% | >99% | >99% | >99% | >99% | >99% | >99% | >99% | >99% | >99% | >99% |
| | Comparative Example 2 | 19% | 80% | 8% | 10% | 83% | 16% | 12% | 89% | 96% | 27% | 14% |
| | Comparative Example 3 | 94% | 0% | 90% | 61% | 75% | 70% | 76% | 90% | 91% | 86% | 94% |
| | Comparative Example 4 | 80% | 75% | 72% | 60% | 62% | 58% | 30% | 90% | 88% | 50% | 77% |

| | | Fe | Co | Ni | Cu | Zn | Ga | As | Cd | Sn | Ba | Pb |
|---|---|---|---|---|---|---|---|---|---|---|---|---|
| 20 ng/L | Example 1 | >99% | 23% | 8% | >99% | >99% | >99% | >99% | 51% | >99% | 16% | 67% |
| | Comparative Example 1 | >99% | >99% | >99% | >99% | >99% | >99% | 26% | 84% | >99% | >99% | >99% |
| | Example 2 | >99% | >99% | >99% | >99% | >99% | >99% | >99% | >99% | >99% | >99% | >99% |
| | Example 3 | >99% | >99% | >99% | >99% | >99% | >99% | >99% | >99% | >99% | >99% | >99% |
| | Comparative Example 2 | 61% | 10% | 5% | 14% | 15% | 89% | 90% | 29% | 41% | 6% | 10% |
| | Comparative Example 3 | 73% | 85% | 85% | 74% | 60% | 92% | 32% | 81% | 65% | 93% | 88% |
| | Comparative Example 4 | 70% | 78% | 58% | 86% | 50% | 42% | 19% | 83% | 61% | 83% | 67% |

Example 4

The same procedure as in Example 1 was carried out except that the water passing conditions were changed to the conditions shown in Table 3. The results are shown in Table 4.

Comparative Example 5

The same procedure as in Comparative Example 1 was carried out except that the water passing conditions were changed to the conditions shown in Table 3. The results are shown in Table 4.

Example 5

The same procedure as in Example 2 was carried out except that the water passing conditions were changed to the conditions shown in Table 3. The results are shown in Table 4.

Example 6

The same procedure as in Example 3 was carried out except that the water passing conditions were changed to the conditions shown in Table 3. The results are shown in Table 4.

TABLE 3

| Ion exchanger Type | | Example 4 | Comparative Example 5 | Example 5 Monolith | Example 6 |
|---|---|---|---|---|---|
| | | Anion | Cation | Cation foregoing stage Anion subsequent stage | Anion foregoing stage Cation subsequent stage |
| φ | mm | 10 | 10 | 10 | 10 |
| Layer height | mm | 20 | 20 | 40 | 40 |
| Volume | m | 1.6 | 1.6 | 3.1 | 3.1 |
| Water passing flow rate | L/h | 6 | 6 | 6 | 6 |
| SV | $h^{-1}$ | 3822 | 3822 | 1911 | 1911 |
| LV | m/h | 76 | 76 | 76 | 76 |

TABLE 4

| | | Li | B | Na | Mg | Al | K | Ca | Ti | V | Cr | Mn |
|---|---|---|---|---|---|---|---|---|---|---|---|---|
| 2000 ng/L | Example 4 | 18% | >99% | 5% | 12% | >99% | 12% | 5% | >99% | >99% | 79% | 10% |
| | Comparative Example 5 | >99% | 10% | >99% | >99% | >99% | >99% | >99% | >99% | >99% | >99% | >99% |
| | Example 5 | >99% | >99% | >99% | >99% | >99% | >99% | >99% | >99% | >99% | >99% | >99% |
| | Example 6 | >99% | >99% | >99% | >99% | >99% | >99% | >99% | >99% | >99% | >99% | >99% |

| | | Fe | Co | Ni | Cu | Zn | Ga | As | Cd | Sn | Ba | Pb |
|---|---|---|---|---|---|---|---|---|---|---|---|---|
| 2000 ng/L | Example 4 | 92% | 15% | 6% | 57% | 59% | >99% | >99% | 27% | >99% | 8% | 50% |
| | Comparative Example 5 | >99% | >99% | >99% | >99% | >99% | >99% | 5% | >99% | >99% | >99% | >99% |
| | Example 5 | >99% | >99% | >99% | >99% | >99% | >99% | >99% | >99% | >99% | >99% | >99% |
| | Example 6 | >99% | >99% | >99% | >99% | >99% | >99% | >99% | >99% | >99% | >99% | >99% |

| | | Li | B | Na | Mg | Al | K | Ca | Ti | V | Cr | Mr |
|---|---|---|---|---|---|---|---|---|---|---|---|---|
| 20 ng/L | Example 4 | 20% | >99% | 4% | 12% | 99% | 21% | 4% | >99% | >99% | 47% | 9% |
| | Comparative Example 5 | >99% | 10% | >99% | >99% | >99% | >99% | >99% | >99% | 86% | >99% | >99% |
| | Example 5 | >99% | >99% | >99% | >99% | >99% | >99% | >99% | >99% | >99% | >99% | >99% |
| | Example 6 | >99% | >99% | >99% | >99% | >99% | >99% | >99% | >99% | >99% | >99% | >99% |

| | | Fe | Co | Ni | Cu | Zn | Ga | As | Cd | Sn | Ba | Pb |
|---|---|---|---|---|---|---|---|---|---|---|---|---|
| 20 ng/L | Example 4 | 91% | 10% | 7% | 60% | 64% | >99% | >99% | 22% | >99% | 6% | 14% |
| | Comparative Example 5 | >99% | >99% | >99% | >99% | >99% | >99% | 25% | >99% | >99% | >99% | >99% |
| | Example 5 | >99% | >99% | >99% | >99% | >99% | >99% | >99% | >99% | >99% | >99% | >99% |
| | Example 6 | >99% | >99% | >99% | >99% | >99% | >99% | >99% | >99% | >99% | >99% | >99% |

In addition, for Example 1, Comparative Example 1, Example 2, Example 3, Comparative Example 2, Comparative Example 3, and Comparative Example 4, a test water 2 as described below was supplied and treated under the water passing conditions shown in Table 1. The results of analysis for each fine particle in the treated water are shown in Table 5.

(Test Water 2)

As the test water 2, a test water was prepared that was adjusted to have a content of 1000 ng/L for $Fe_3O_4$ fine particles with an average particle diameter of 5 nm (particle diameter: not less than 4 nm and less than 6 nm), a content of 1000 ng/L for $Fe_3O_4$ fine particles with an average particle diameter of 10 nm (particle diameter: not less than 9 nm and less than 11 nm), a content of 1000 ng/L for $Fe_3O_4$ fine particles with an average particle diameter of 30 nm (particle diameter: not less than 29 nm and less than 31 nm), and a content of 1000 ng/L for $Al_2O_3$ fine particles with a particle diameter of 30 to 60 nm.

Note that the test water 2, a solution of $Fe_3O_4$ fine particles and $Al_2O_3$ fine particles, was prepared from an "iron oxide solution, aluminum oxide solution" available from Sigma-Aldrich Co. LLC. Note that the particle diameter was measured with a transmission electron microscope (TEM).

(Analysis)

The content of each fine particle in the test water and the treated water was measured by ICP-MS to determine the removal rate.

Note that, in the analysis for the content by ICP-MS, a plurality of standard samples with different contents were used in advance to create a calibration curve for the count value (CPS) and the metal particle content, the test sample (test water or treated water) was measured, and a metal particle content corresponding to that count value was defined as the metal particle content of the test water or treated water, based on the calibration curve.

TABLE 5

|  | Fe 5 nm | Fe 10 nm | Fe 30 nm | Al |
|---|---|---|---|---|
| Example 1 | 95% | 97% | >99% | >99% |
| Comparative Example 1 | 85% | 95% | 97% | >99% |
| Example 2 | >99% | >99% | >99% | >99% |
| Example 3 | >99% | >99% | >99% | >99% |
| Comparative Example 2 | 50% | 52% | 55% | 55% |
| Comparative Example 3 | 40% | 42% | 45% | 45% |
| Comparative Example 4 | 55% | 57% | 60% | 62% |

From the contrast between Example 1 and Comparative Example 1, and the contrast between Example 4 and Comparative Example 5, the monolithic organic porous anion exchanger can almost completely remove B and As, which were difficult to be removed by the monolithic organic porous cation exchanger. Meanwhile, from Comparative Example 2, the removal performance for B and As by the particulate anion exchange resin is not as good as that of the monolithic organic porous anion exchanger.

In addition, from Example 2 and Example 3, by using the monolithic organic porous cation exchanger in combination with the monolithic organic porous anion exchanger, Cd, which could not be completely removed by the monolithic organic porous cation exchanger alone or by the monolithic organic porous anion exchanger alone, can be removed almost completely. Therefore, by using the monolithic organic porous cation exchanger in combination with the monolithic organic porous anion exchanger, the impurity elements used in Examples and Comparative Examples can be removed almost completely.

The monolithic organic porous anion exchanger of Example 1 exhibited excellent removal performance for Fe particles with an average particle diameter of 5 nm and an average particle diameter of 10 nm, for which the monolithic organic porous cation exchanger has insufficient removal performance.

In Examples 2 and 3, by combining the monolithic organic porous cation exchanger and the monolithic organic porous anion exchanger, the Fe particles with different particle diameters and the Al particles could be completely adsorbed.

REFERENCE SIGNS LIST

1 Monolithic organic porous anion exchanger
2 Monolithic organic porous cation exchanger
3 Inflow space for water to be treated
5 Connection part
6 Filling container
7 Discharge port for treated water
8 Seal member
9 Supply port for water to be treated
10 Ion exchanger filling cartridge
11 Connection pipe for supplying water to be treated
13 Supply inner pipe for water to be treated
14 Sealing member
15 End sealing part
16 Discharge outer pipe for treated water
17 Connection pipe for discharging treated water
20 Ion exchanger-filled module
21 Housing
22 Water to be treated
23 Treated water
24 Ultrapure water
25 Primary pure water
26 Raw material water for ultrapure water production
27 Ultrapure water production system
28 Raw water
29 Use point
30 Pretreatment system
31 Flocculation filtration apparatus
32 Activated carbon column
33 Reverse osmosis membrane module
34 Ion exchange resin apparatus
35 Primary pure water production system
40 Primary pure water storage tank
41 Heat exchanger
42 Ultraviolet oxidation system
43 Non-regenerative cartridge polisher filled with an ion exchange resin
44 Deaeration membrane apparatus
45 Ultrafiltration membrane apparatus
46 Secondary pure water production system
51 Substrate treatment apparatus
52 Each treatment chamber
60 Pipe for transferring ultrapure water
61 Circulation pipe

The invention claimed is:

1. A method for producing ultrapure water to supply, to a use point, the ultrapure water obtained by treating raw material water for ultrapure water production in an ultrapure water production apparatus,
wherein the raw material water for ultrapure water production contains metal impurities of both of:
at least one element selected from the group consisting of B and As, and
at least one element selected from the group consisting of Al, Ti, Cr, Fe, Cu, Zn, Sn, V, Ga, and Pb,
wherein an ion exchanger-filled module filled with at least a monolithic organic porous anion exchanger is installed in a treatment path of the ultrapure water production apparatus or in a transfer path from the ultrapure water production apparatus to the use point, and the raw material water to be treated is passed through the ion exchanger-filled module for treatment, and
wherein the raw material water to be treated is passed through the monolithic organic porous anion exchanger-filled module at a water passing speed SV of greater than or equal to 1274 $h^{-1}$ and less than or equal to 20000 $h^{-1}$ to remove the metal impurities from the raw material water and produce the ultrapure water.

2. The method for producing ultrapure water according to claim 1, wherein all of the raw material water for ultrapure water production or a part of another raw material water to be mixed with the raw material water for ultrapure water production is collected washing water that has been used for washing semiconductors in a semiconductor production process.

3. The method for producing ultrapure water according to claim 1, wherein the monolithic organic porous anion exchanger is formed of a continuous framework phase and a continuous pore phase; the continuous framework phase has a thickness of a continuous framework of 1 to 100 µm, the continuous pore phase has an average diameter of continuous pores of 1 to 1000 µm, and a total pore volume of 0.5 to 50 mL/g; the monolithic organic porous anion exchanger has an anion exchange capacity of 0.1 to 1.0 mg equivalent/mL in a wet state; and the monolithic organic porous anion exchanger has anion exchange groups that are uniformly distributed in the monolithic organic porous anion exchanger.

4. The method for producing ultrapure water according to claim 3, wherein the monolithic organic porous anion exchanger is a co-continuous structural material formed of a three dimensionally continuous framework by intertwining the continuous framework phase and the continuous pore phase, the monolithic organic porous anion exchanger comprising an aromatic vinyl polymer containing 0.1 to 5.0 mol % of crosslinked structural units among all the entire constituent units provided in the monolithic organic porous anion exchanger, with an average thickness of 1 to 60 μm in a dry state, and three dimensionally continuous pores in the three dimensionally continuous framework with an average diameter of 10 to 200 μm in a dry state; the monolithic organic porous anion exchanger has a total pore volume of 0.5 to 10 mL/g in a dry state; and the monolithic organic porous anion exchanger has an anion exchange capacity per volume in a water wet state of 0.2 to 1.0 mg equivalent/mL.

5. The method for producing ultrapure water according to claim 1, wherein the ion exchanger-filled module is filled with a cation exchanger in a stage preceding or subsequent to the monolithic organic porous anion exchanger.

\* \* \* \* \*